United States Patent [19]

Webber et al.

[11] Patent Number: 5,021,953
[45] Date of Patent: Jun. 4, 1991

[54] TRIP PLANNER OPTIMIZING TRAVEL ITINERARY SELECTION CONFORMING TO INDIVIDUALIZED TRAVEL POLICIES

[75] Inventors: David W. Webber, Old Greenwich; Sandra E. Kangas, Greenwich, both of Conn.

[73] Assignee: Travelmation Corporation, Stamford, Conn.

[21] Appl. No.: 492,260

[22] Filed: Mar. 12, 1990

Related U.S. Application Data

[63] Continuation of Ser. No. 142,843, Jan. 6, 1988, abandoned.

[51] Int. Cl.$^5$ .............................................. G06F 15/26
[52] U.S. Cl. ..................................... 364/407; 364/401
[58] Field of Search .......................... 364/401, 407–408

[56] References Cited

U.S. PATENT DOCUMENTS

| | | | |
|---|---|---|---|
| 2,910,238 | 10/1951 | Miles | 364/401 |
| 2,995,729 | 8/1961 | Steele | 364/407 |

FOREIGN PATENT DOCUMENTS

| | | | |
|---|---|---|---|
| 0173670 | 9/1985 | Japan | 364/407 |
| 0191362 | 9/1985 | Japan | 364/407 |

OTHER PUBLICATIONS

OAG Electronic Edition, Dialog, 1986.
Nadine Goodwin, "Agency Funded by 3M, Set to Market Software", Travel Weekly, Oct. 13, 1986.
Nadine Goodwin, "Agency Dares to Launch Its Own Air Res. System", Travel Weekly, vol. 45, No. 93, Oct. 23, 1986.
Travelmation Brochure, "Read This If You Think Savings Billions On Travel Is Worthwhile But Impossible", 1987.
Travelmation Brochure, "How To Create A Corporate Travel Policy That Works", 1987.
Travelmation Brochure, "What Exactly Do Travel Agencies Do? In Some Cases Very, Very Little".
Godwin, Nadine, "New Software Was Key Lure In $17 Million Agency Buyout", Travel Weekly, Nov. 26, 1984.
"Woodstar Avatar To Provide Desk—Top Travel Control", Apr. 1, 1986, PR Newswire Press Release.
"Thomas Cook Travel Exclusive Agreement", Jan. 12, 1987, PR Newswire.
"Advisory: Price Warehouse Travel Management Services", Jan. 28, 1987, PR Newswire.
"Price Waterhouse Announces Travel Management Services", Feb. 2, 1987, PR Newswire Press Release.
Berger, Laurie, "Policy—Obedient Computer Picks Best Flights", Mar. 1986, Travel Weekly.
"Air Auditor Demonstration Package User's Manual", Dec. 1986, User's Manuel.
"Avatar New Air Auditor Software Package", Apr. 11, 1986, PR Newswire, Press Release.
"Searching For The Lowest Fare", Travel Weekly, Oct. 31, 1986.

*Primary Examiner*—Michael R. Fleming
*Assistant Examiner*—Gail O. Hayes
*Attorney, Agent, or Firm*—Cooper & Dunham

[57] ABSTRACT

A travel planner system automatically constructs itineraries with available seats for a traveler's trip request which conform to pre-stored reasonableness standards which includes a satisfactory check on whether a connecting flight distance exceeds that of a possible direct flight by a preset distance or ratio. The system finds the fares in a process which includes constructing sum-of-segments fares for each such itinerary which are valid under all the applicable airline tariffs and rules, finds itinerary-with-fare combinations acceptable in terms of cost and convenience to the traveler in accordance with an individualized travel policy of the traveller, and displays at least some of the itineraries by departure or arrival time.

2 Claims, 18 Drawing Sheets

Microfiche Appendix Included
(5 Microfiche, 930 Pages)

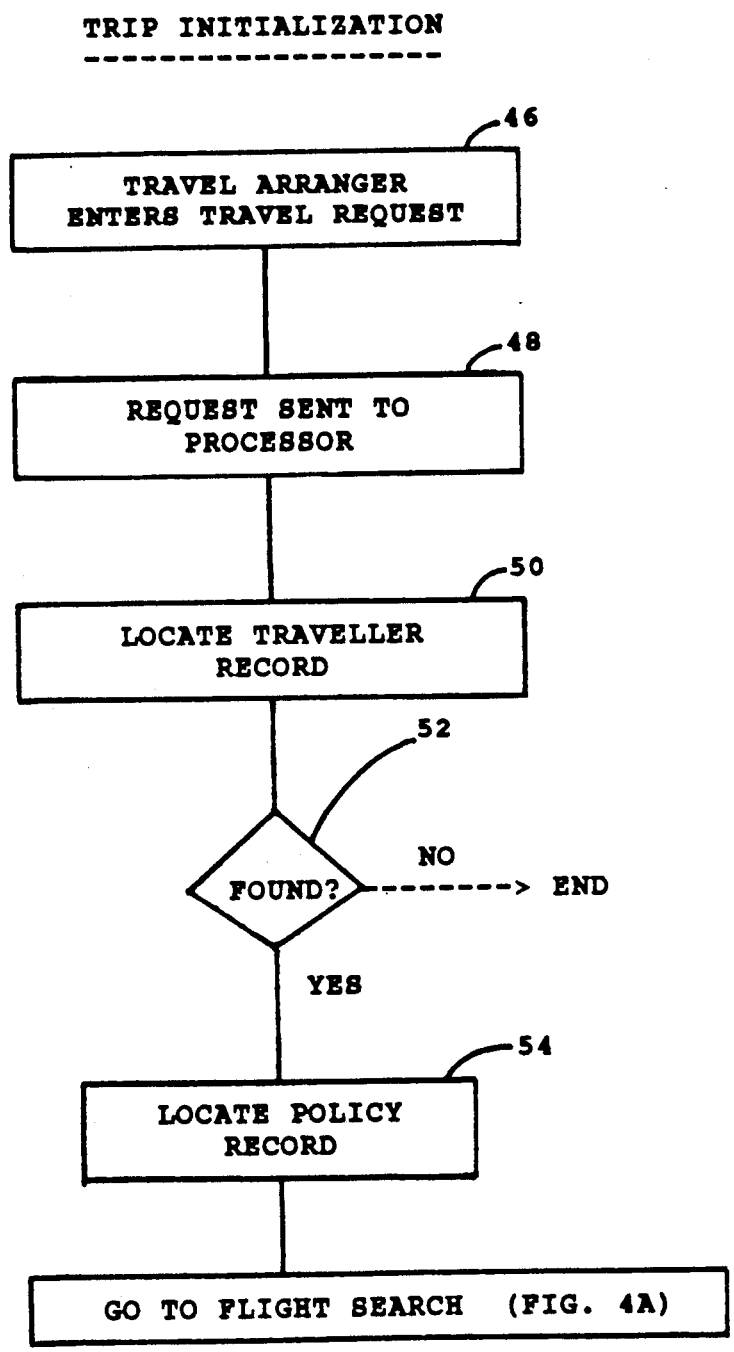

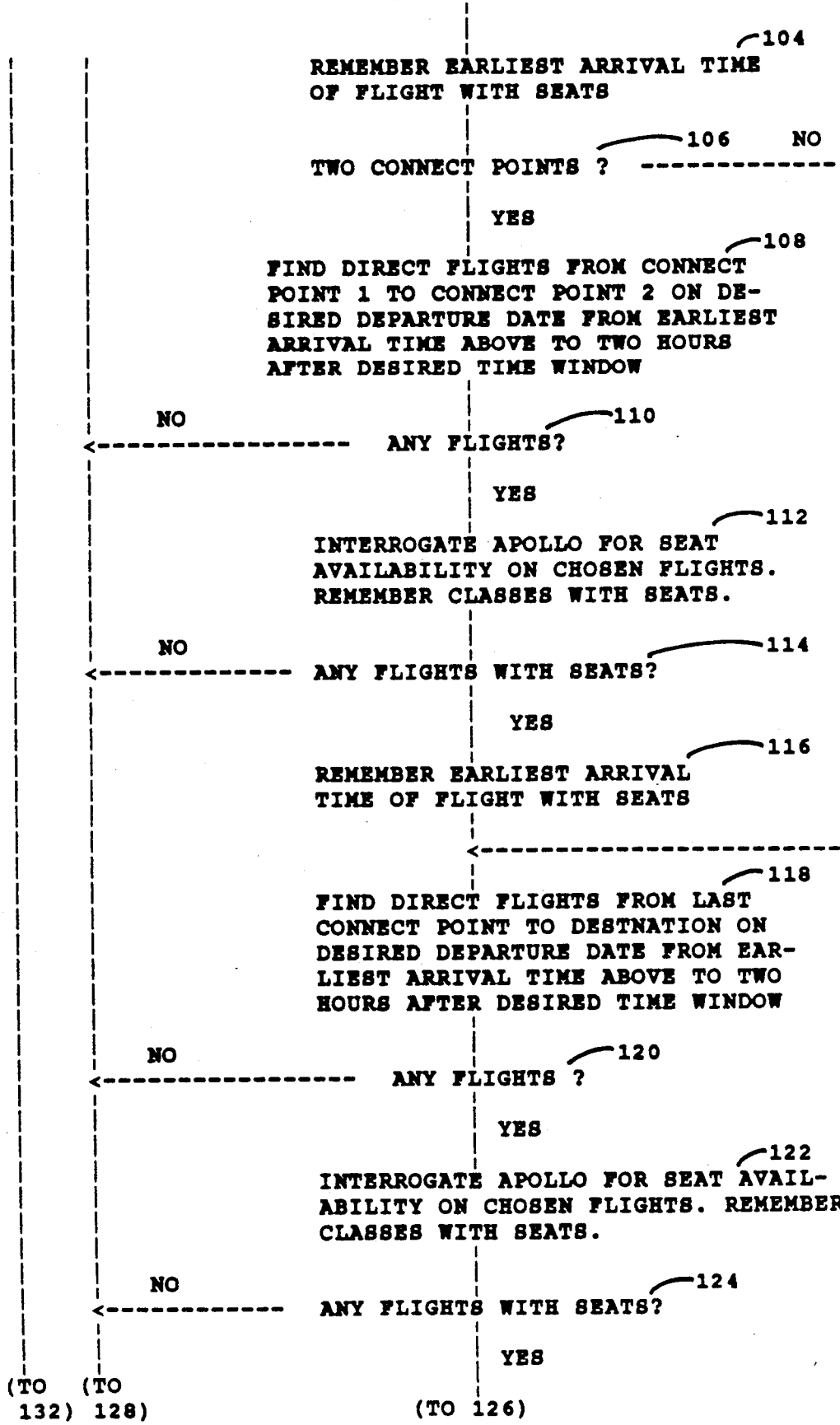

FIG. 4E

(FROM 142)

CALCULATE THE PREFERENCE RANK FOR ─ 144
   EACH ITINERARY:
   SET THE PREFERENCE RANK = THE NON-
      PREFERENCE RANK
   ADD 100 X EACH FLIGHT ON A PREFERRED
      AIRLINE
   SUBTRACT 100 X EACH FLIGHT ON AN
      AIRLINE TO BE AVOIDED
   ADD 100 X EACH USE OF A PREFERRED
      AIRPORT
   SUBTRACT 100 X EACH USE OF AN AIRPORT
      TO BE AVOIDED

─ 146         YES
ANY MORE FLIGHT  ─────────────> C (TO 58)
REQUESTS?

GO TO FARE SEARCH (TO FIG. 5A)

FIG. 7C

R ──────────────>
(FROM
258)
              ─ 294
ARE THERE ANY MORE          YES
FARES?        ─────────────> N (TO 256)

NO
              ─ 296
DISPLAY THE N ITINERARIES
WITH FARES

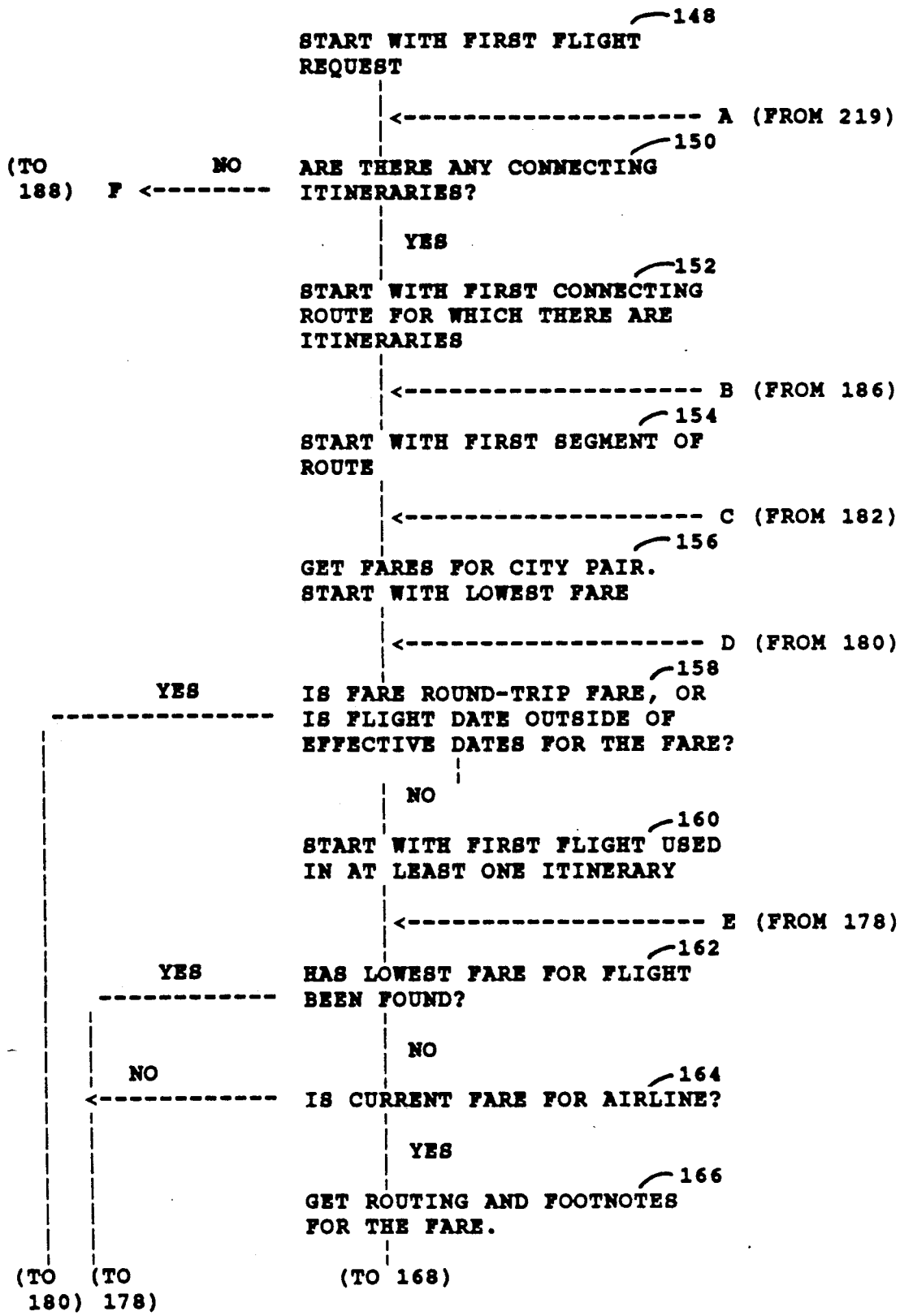

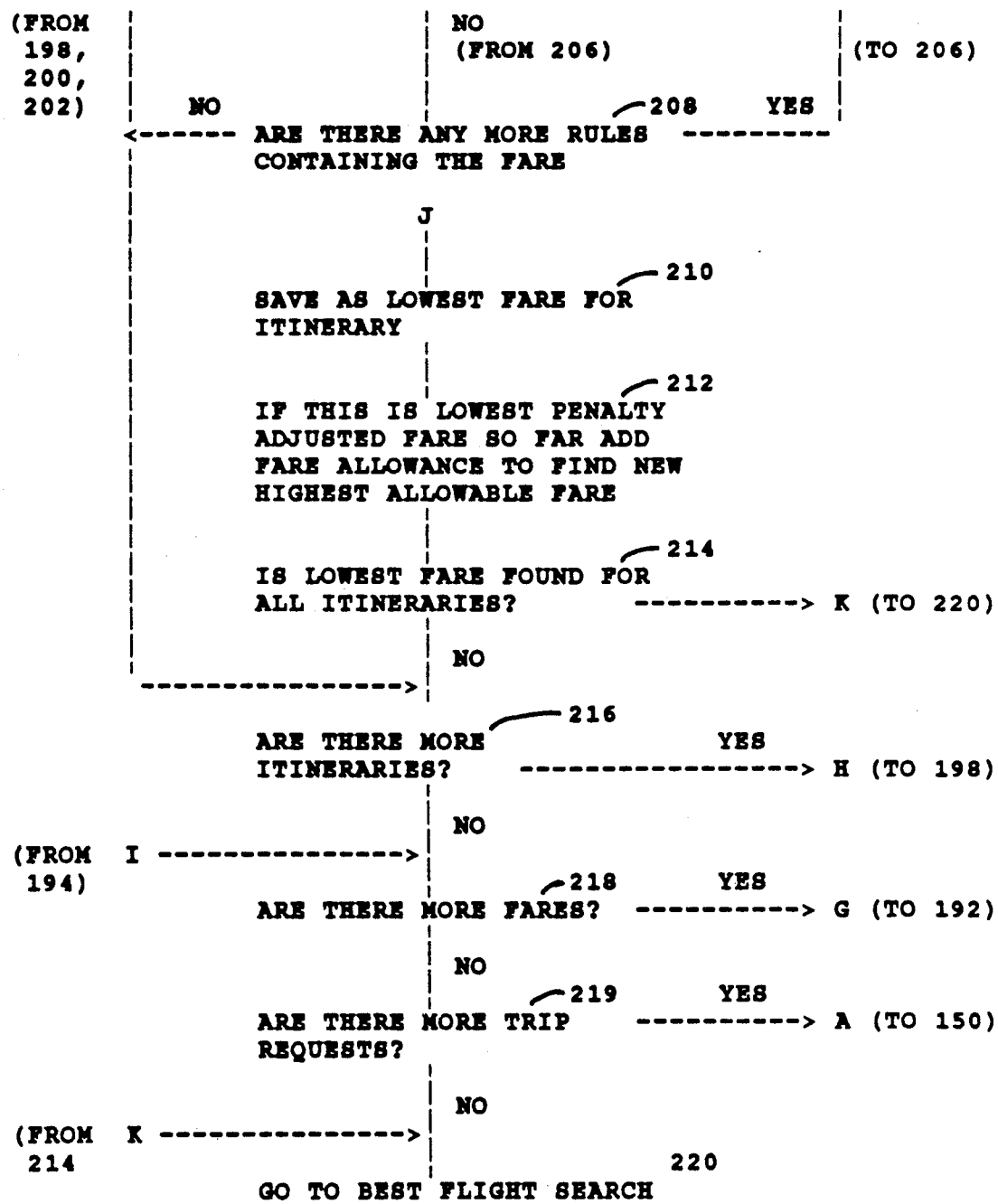

TRIP PLANNER OPTIMIZING TRAVEL ITINERARY SELECTION CONFORMING TO INDIVIDUALIZED TRAVEL POLICIES

This is a continuation of application Ser. No. 142,843 now abandoned, filed Jan. 6, 1988.

The appendix includes 4 fiche of 208 frames each and 1 fiche of 98 frames.

BACKGROUND AND SUMMARY OF THE INVENTION

The invention is in the general field of travel reservation and ticketing system such as the airline reservation systems used by airline ticket agents and by travel agents as well as to a certain extent by individuals through databank services such as the Dow Jones or Dialog services. Examples of such reservation systems are known under the trade names Apollo (United Airlines) and Sabre, and early versions of some are believed to have been in use since at least the 1960's. Other examples are systems which are designed for use primarily on or through personal computers. Examples are known under the trade names ELECTRONIC OAG, EAASY SABRE, CORPORATE APOLLO, COMMERCIAL PARS, LIFECO REZPLUS (uncertain if usable with a standard PC), SYSTEM ONE C SERIES and AIRPLAN. The systems which are for use on or through a personal computer typically connect to a larger system, such as Apollo, through a communication device to use information therefrom and to book flights and make other travel arrangements.

The known prior art systems are believed to suffer from a number of limitations which have come into particular focus since airline deregulation brought about an unprecedented increase in the options available to the traveller and in the daily changes in flight fares, restrictions, etc. For example, it is believed that well in excess of one hundred thousand separate fare changes are made and published every day, and this only for flights in the United States. Only some of those fares are reflected in the known prior art systems. According to one estimate, when a travel arranger requests the lowest fare itinerary about a fifth of the fares accessed from the Apollo system are accompanied by a message "Need rules validation," indicating that the fare shown on the screen is subject to restrictions or changes not checked automatically. The travel arranger must then display the rules in English and decide if the fare is valid. If it is not, there is no provision for automatically finding the next higher fare and the travel arranger must display the fares and the rules for each fare, or look at the most recent rulebook available at the time (such as the biweekly ATPCO Passenger Tariff Set, which is the size of a big-city telephone book) and hope that the information there still holds or, as is more typical, telephone the airline or airlines in charge of the flight or flights of interest to check each flight (and hope that the airline employee has accurate information). The problem is multiplied when the travel arranger seeks to investigate several possible itineraries and the trade-offs between them, such as the typical trade-offs between the cost of the travel in terms of ticket price and in terms of travel time and convenience. Of course, this can impose on the travel arranger the conflicting requirements of finding the best value for a particular itinerary while at the same time minimizing the time it takes to arrange a particular trip, and one of these requirements may win at the expense of the other when the known prior art systems are used.

In contrast, in the invention described and claimed here the travel arranger only need to enter a trip request, and the system responds by fully automatically and rapidly finding the least costly but still valid itineraries in terms of a preset policy, individualized for the particular traveller, regarding acceptable or desirable price tradeoffs between cost on the one hand and time and convenience on the other. There can be an individualized policy stored in the invented system for each traveller or, more typically for each group of travellers who share some common characteristic (e.g., employed at a similar level in the same company), and a travel policy can be tiered, to automatically accommodate the various levels of employees who may travel or for the kind of travel for an individual or a group. For example, a team of engineers going to a customer's site to service equipment on emergency basis could be expected to travel via priority transportation, with as little delay as possible, even if it means paying more. But a team of accountants travelling to a subsidiary for a regular quarterly audit could agree to travel via connecting flights, spending a little more time on travel but less money. Different considerations also can apply when an individual travels on business and when the same person travels for other reasons. It is difficult, if not impractical, to optimize the itinerary for the particular needs of the traveler using the known prior art systems, but this can be done particularly conveniently and rapidly using the invented system.

For example, while the known prior art systems such as Apollo can usually find the lowest fare..on a given flight, it is believed that only the invented system can automatically find not only this but also the flight or flights with the lowest fare for a specified itinerary. It is believed that only the invented system can automatically, without taking up the valuable time of the travel arranger, take into account details of a preset corporate travel policy, as well as of individual preferences, such as the trade-off between ticket price and travel time (e.g., a customer's travel policy can specify that only nonstop flights should be used if available, or that stops are allowed but only when the fare is at least $25 less than for a nonstop flight, or that connecting flights are allowed but only if the added trip time is less than 2 hours and the fare is at least $120 less than for a nonstop flight, etc.), trade-offs between ticket price and trip timing (e.g., trips with a departure time after 6 P.M. are allowed but only if the fare saving is over $150, etc.), tradeoffs between airports serving the same city (e.g., Newark airport can be used in preference to LaGuardia but only if the fare saving is over $25, etc), tradeoffs between ticket price and comfort (e.g., first class can be used when the trip is over 1500 miles, etc.), trade-offs between ticket price and the needs of a particular trip (e.g., an override code that a particular trip must use the fastest way, or must use only a nonstop flight, etc.), as well as other trade-offs and customer preferences.

As compared with known airline reservation systems which can be used on or through a personal computer or a special terminal, the invented system is believed to have significant advantages which include the ability to automatically find not only the lowest fare on a given flight but also the unprecedented ability to automatically find the flight or itinerary with the lowest fare, the ability to automatically take into account in this process the details of a preset, comprehensive corporate travel policy as well as preset details of personal travel preferences, the ability to show flight, fare and seat availability on the same screen and the ability to print itineraries and tickets at the location of the travel arranger, even an individual accessing the system through a modem from a personal computer.

In a exemplary and nonlimiting embodiment, the invented airline reservation system automatically selects least-cost, valid trip itineraries which conform to preset, individualized travel policies, by using a processor with access to a tariff file and a traveler file and a rule file and with access to one or more airline booking systems (such as Apollo) for seat availability and for booking. The processor can be accessed from personal computers and terminals connected to it directly (e.g., by a cable or a dedicated line) or through a communication device such a modem using the telephone system under the control of a suitable communication software. The tariff file in the processor contains, in machine-readable form: airline schedules which can be obtained from a source such as the ABC Guides; routings and footnotes which can be obtained from a source such as the Airline Tariff Publishing Co. (ATPCO); legal connecting times which can be obtained from industry sources; and fares, which can be obtained from ATPCO. As an example of the kind of information available from ATPCO, see ISSUE 321, May 20, 1987, of the ATPCO PASSENGER TARIFF SET, which is hereby incorporated by reference in this specification. This tariff file, as stored in a processor operating in accordance with the invention is typically updated daily to reflect the daily fare changes which typically number in the hundreds of thousands, and similarly frequent and extensive changes typically are made in the rules file as well. The traveler file contains, also in machine-readable form, information such as a set of corporate travel policies and personal profiles of individual travellers (such as credit card numbers, frequent traveller numbers, seating and other travel preferences, which corporate travel policy applies to that individual, etc.). For example, a corporate travel policy can identify a corporate customer and can be tiered to specify the respective travel policy for each of several groups of employees (e.g., high management, middle management and other employees) and, if desired, for individuals as well. Each travel policy sets forth rules which define the trade-offs between cost and the traveler's time and convenience and personal travel preferences as well. The rules file contains in machine-readable form the rules governing the use of particuler fares for particular flights or itineraries, specifying, for example, that a particular fare may be used only on weekend flights. These rules are supplied, in English, by sources such as ATPCO; however this information is reformatted in accordance with the invention in a novel manner which allows the invented process to be carried out fully automatically and to carry out procedures and obtain results which the known airline reservation systems cannot. The known airline reservation systems do not store all of the rules information and thus cannot automatically ensure automatic validation of fares, flights, etc., and are unable to efficiently apply the incomplete rules information which they do store to more than one flight or itinerary at a time. The invented system reformats the rules (e.g. those supplied by ATPCO) such that they can be used fully automatically by the invented process, in a fast and efficient procedure which does not require human intervention to find one or more of the best itineraries for a trip request which both have the lowest valid fares according to these rules and meet a policy as to the trade-off between fare and convenience. While the rules file could be considered as a part of the tariff file, it is shown and described here as a separate file because it is formatted in a fundamentally different manner from the rest of the information in th tariff file and because it is used in a fundamentally different way in accordance with the invention. The travel arranger can be an airline ticket or reservation agent, a travel agent or an individual traveler who uses an entry device such as a personal computer or a computer terminal to enter travel parameters identifying a customer (and therefore a travel policy) and a trip (e.g., a departure and arrival location and a departure and/or arrival time window) and, if desired, any override requests, such as that only nonstop flights can be used on this trip (although the policy specifies that connecting flights are generally allowed). The exemplary system also includes a communication device for communicating with one or more airline booking systems (such as Apollo) which can provide information on seat availability on specified flights per booking class and can allow those flights to be booked. The processor which forms a part of this exemplary embodiment of the invented system responds to the travel parameters entered by the travel arranger to machine-interrogate the tariff file in accordance with these parameters and the relevant contents of the rules file and to rapidly sift through what may be thousands of currently available flights, fares and rules for a given trip and to find the lowest fare for which the particular traveler and trip qualify and for which seats are available, automatically communicating as needed with the airline booking system. In particular, the processor uses the tariff file to automatically find all appropriate flights and itineraries for the trip time window and departure and arrival locations, automatically communicates with the airline reservation system (e.g., Apollo) to check seat availability on these flights, uses the tariff file to find the lowest fares for the itineraries for which seats are available, using the particular customer's travel policy and other traveler file information to apply that customer's travel constraints and trip parameter trade-offs to these possible itineraries and thereby select the least-cost itinerary which still conforms to that customer's travel policy and any overrides (and, if desired, selects one or more next-best itineraries to give the customer a choice), and then books the selected itinerary and arranges for ticket issuance.

Various aspects of features of an earlier development are discussed in two articles in the travel trade press, which are hereby incorporated by reference in this specification: (1) Goodwin, N., Agency Dares to Launch Its Own Air Res System, TRAVEL WEEKLY, October 23, 1986, and (2) Goodwin, N., Agency, Funded by 3M, Set to Market Software, BUSINESS TRAVEL, October 13, 1986.

BRIEF DESCRIPTION OF THE DRAWINGS

FIG. 3 is a flow chart illustrating a trip initialization process which forms a part of an example of the invention.

DETAILED DESCRIPTION OF AN EXEMPLARY EMBODIMENT OF THE INVENTION

Figure 1:
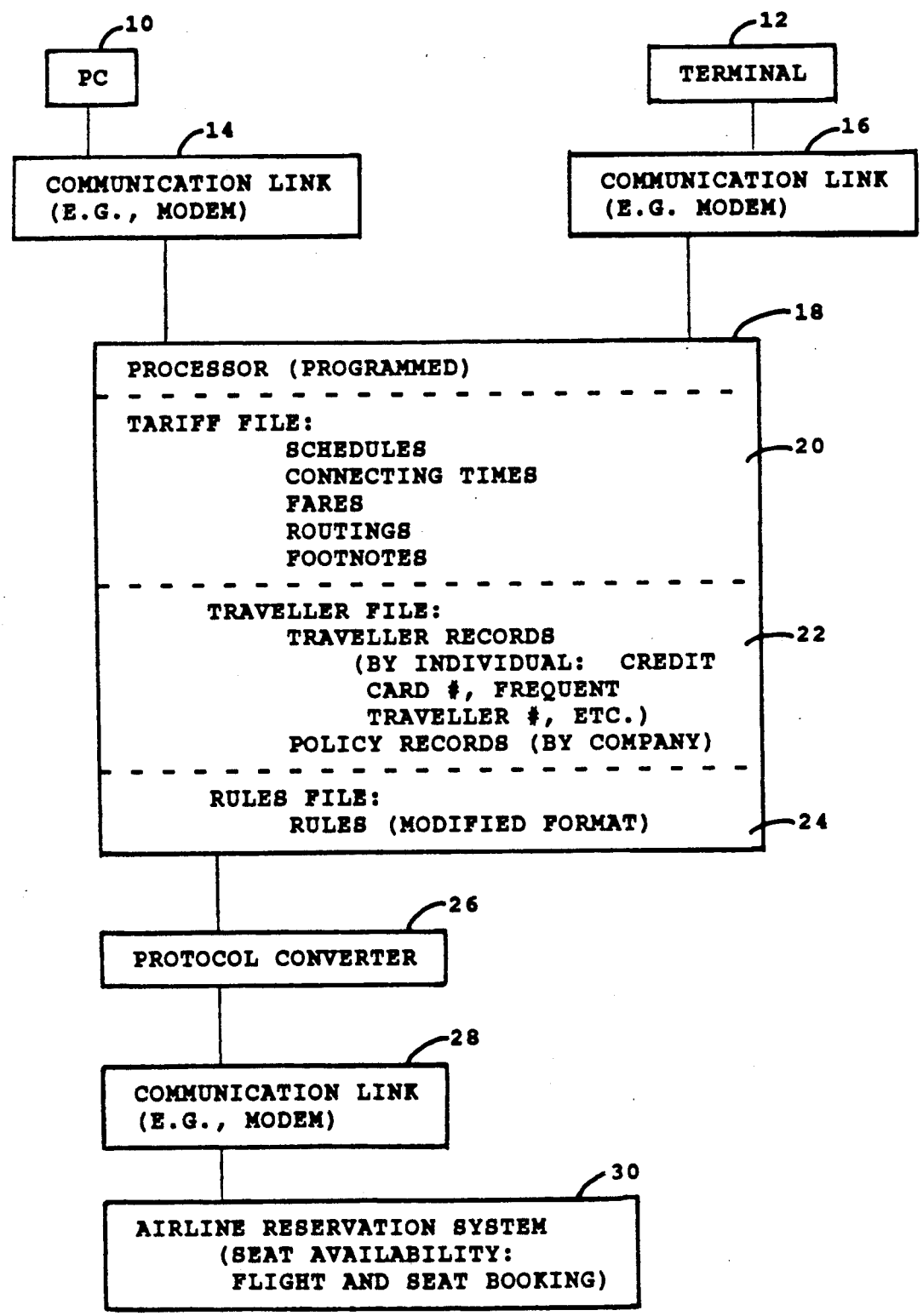
FIG. 1 is a generalized block diagram of an exemplary system embodying the invention.

Referring to FIG. 1, an exemplary and nonlimiting embodiment of the invention comprises entry devices such as one or more personal computers, e.g., PC 10, and one or more computer terminals, e.g., terminal 12. Each entry device can have a screen and a printer (not shown) and each communicates with a processor 18 through a respective communication link 14 or 16, each of which can be a direct cable or some other hardwired connection or can be a device such as a modem operating under suitable communication software to connect the entry device to processor 18 through the telephone network or through some other communication link. Processor 18 includes, or communicates with, a storage device which includes a tariff file 20, a traveler file 22 and a rules file 24 and, through a protocol converter 26 and another communication link 28, with an airline reservation system 30 such as the system tradenamed Apollo. In the alternative, an airline reservation system such as Apollo can be made integral with the rest of the system illustrated in FIG. 1: e.g., processor 18 and its functions can be integrated into and made a part of an airline reservation system such as Apollo. In one exemplary implementation of the invention, processor 18 can be an IBM 4341 mainframe using the VM-CMS operating system and having a configuration sufficient for carrying out the process described in this specification, when translated to a suitable high level language (such as FORTRAN) and suitably compiled for running on said mainframe.

As illustrated, tariff file 20 can be a part of a mainframe computer or can be in a separate memory device, and contains a number of different sub-files, including: airline schedules, which can be obtained from a source such as the ABC Guides; routings and footnotes, which can be obtained from a source such as the Airline Tariff Publishing Co. (ATPCO), wherein routings set forth information such as if a particular fare can be used on a particular flight and footnotes set forth information such as when a particular fare is in effect, etc.; legal connecting times, which can be obtained from industry sources; and fares, for example by booking class, which can be obtained from ATPCO. This file is typically updated daily to reflect the daily fare and rule changes which typically number in the hundreds of thousands. Traveler file 22 can be similarly implemented in terms of hardware and contains traveler records and policy records. Each traveler record typically is for a specific individual and contains identifying information such as name and addresses and telephone numbers, credit card numbers, frequent traveler numbers, seating and other travel preferences, a pointer to a particular travel policy record which applies to that individual, etc. Each policy record typically is for a particular group of employees of a particular company (e.g., top level executives, middle level executives, and other employees) and defines the travel policy of that company for that group of employees, for example as discussed in brochure TMOO1/1-87 by the assignee of this invention, which is hereby incorporated by reference into this specification. Typical parts of a policy file are the identity of the corporate customer and the rules which apply to different groups of employees and to individuals and define for each the permissible tradeoffs between ticket cost and travel convenience and time. Rules file 24 also can be similarly implemented in terms of hardware and contains in machine-readable form the rules (eg., the ATPCO rules) in the novel format of this invention which makes them usable for practicing this invention.

Figure 2:
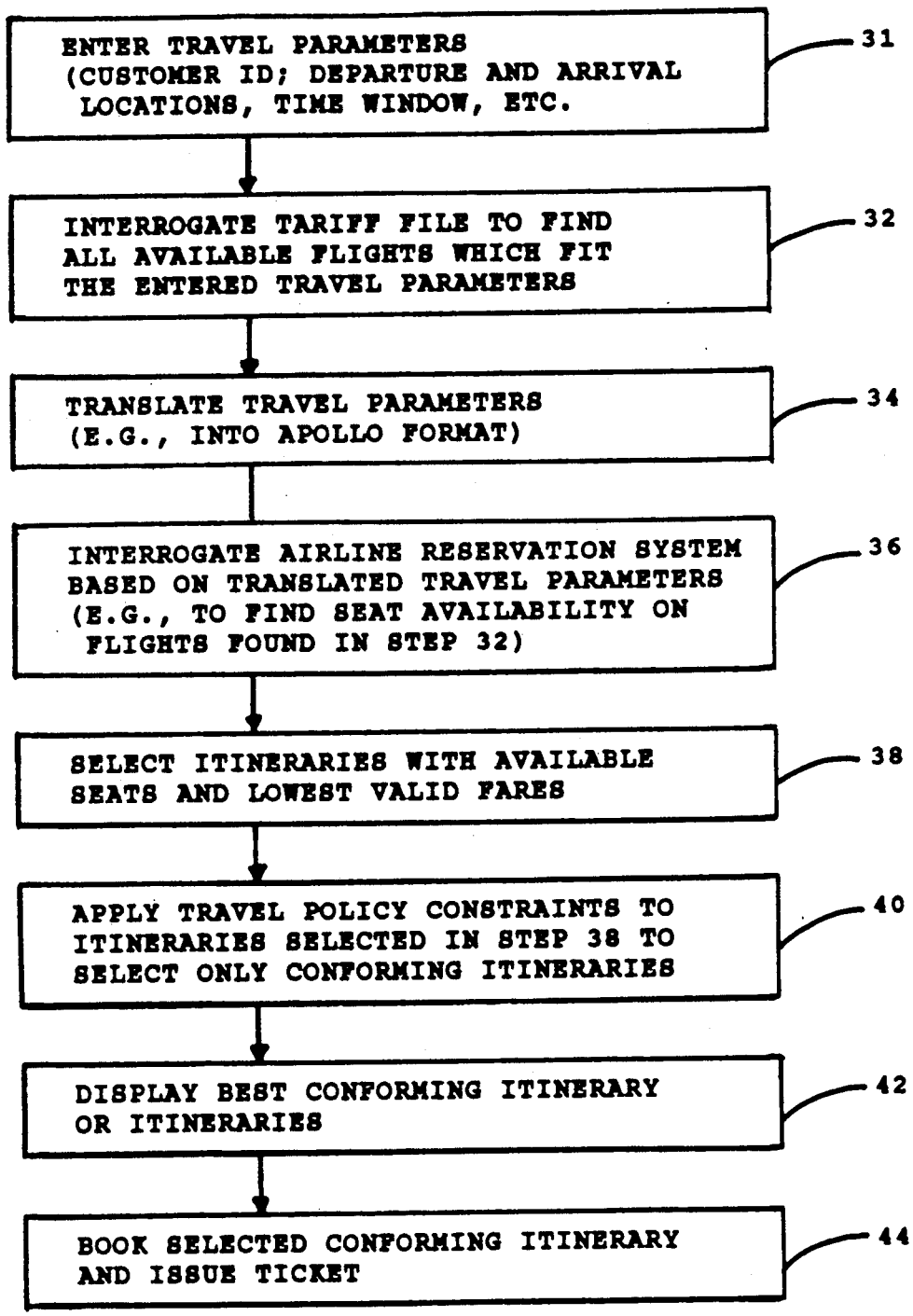
FIG. 2 is a flow chart illustrating major steps in carrying out a process in accordance with an example of the invention.

As illustrated in FIG. 2, when using the system a travel arranger enters at step 31 the relevant travel parameters using an entry device such as PC 10 or terminal 12. These parameters can include the customer identification and the departure and arrival locations (e.g., cities) and a time window which can be specified, for example, in terms of a time window for departure and/or arrival times. This information is transmitted to processor 18 through devices such as 14 and 16, and at step 32 processor 18 interrogates tariff file 20 to find all available flights which are appropriate because they fit the trip parameters: e.g., nonstop flights, direct flights, connections, etc. At step 34 processor 18 translates the travel parameters and the information on appropriate flights found in step 32 into a format suitable for an airline reservation system such as Apollo, and at step 36 communicates through a device such as 28 with the airline reservation system to check seat availability for the appropriate flights found in step 32. For this interrogation processor 18 uses the protocol which is established by the airline reservation system for use by, for example, travel agents, and the only difference from the point of view of the airline reservation system is that unusually rapid and numerous requests are being made to check seat availability. After seat availability has been checked at step 36 for all of the appropriate flights identified for this particular trip at step 32, processor 18 sorts the itineraries which have available seats by lowest total valid fare, using in the process all relevant information in the tariff file and the rules file which determines if a fare is valid for these trip parameters. At step 40 processor 18 applies the constraints of the particular travel policy record and traveler record of the customer identified in step 30 to the itineraries remaining after step 38. The best itineraries which remain after step 40 are the least cost itineraries which both have available seats and fares and meet the particular constraints of the individualized travel policy of the customer being serviced and any overrides that may have been entered at step 30. The best such itinerary (or the several best itineraries) are displayed at step 42, e.g. on the screen of the relevant entry device such as 10 of 12 or by printing them on printers at the relevant entry device. At step 44 the selected itinerary can be booked (the flights can be "sold") through the airline reservation system, with processor 18 automatically carrying out the steps which a travel agent would carry to book an itinerary on a system such as Apollo, and a ticket can be issued at a printer at the entry device if the device is operated by a facility authorized to issue tickets.

FIG. 3 is a flow chart illustrating a trip initialization procedure which corresponds to step 31 in FIG. 2, and in which the travel arranger specifies a trip (e.g., by specifying the origin and destination and the time window for departure and/or arrival) and identifies the traveller and enters any appropriate constraints, such as than no penalty fares are allowed for this trip (e.g., no cancellation penalties), that special requests are made (e.g., special meals), etc. Specifically, at step 46 of FIG. 3 the travel arranger enters a travel request, e.g., through the keyboard of a PC 10 or a terminal 12, specifying travel parameters such as the identity of the traveler, the origin and destination locations and the time window or windows for a trip. For example, the format of a trip request usable in the invented process can be:

| MR DAVID WEBBER | OF TRAVELMATION, INC. | |
| --- | --- | --- |
| FROM LAGUARDIA | TO FORT MYERS | |
| ON 5 JAN | DEPART BETWEEN 8 AM AND 10 AM | |
| RETURN 17 JAN | LEAVE AFTER 5 PM | ARRIVE NO LATER THAN 9 PM |

In the above example the normal characters are a part of the template or are provided from a stored database, and the bold characers are keyed in by the travel arranger. At step 48 this information (the trip request) is sent to processor 18 in the manner earlier described, and at step 50 processor 18 searches traveller file 24 to locate the traveler record for this traveller, e.g., in a name search (or a search on some other appropriate basis). If the test at step 52 determines that there is no traveler record for this individual, the procedure ends so that the travel arranger (or a system administrator) can then create a traveller record, and the procedure can start again at step 46. After the test at step 52 shows that the relevant traveler record has been found in step 50, the system searches at step 54 for the policy record applying to this individual. This search at step 54 can be on the basis of a pointer contained in the traveller record (for each individual there is a travel policy record; the same policy record can apply to several individuals). The trip initialization procedure ends after it locates the traveller record and the policy record for the particular individual, and these records, together with the other information regarding the trip which the travel arranger has keyed in, become the "trip request" which is made available for the flight search procedure illustrated in FIG. 4.

Figure 4A:
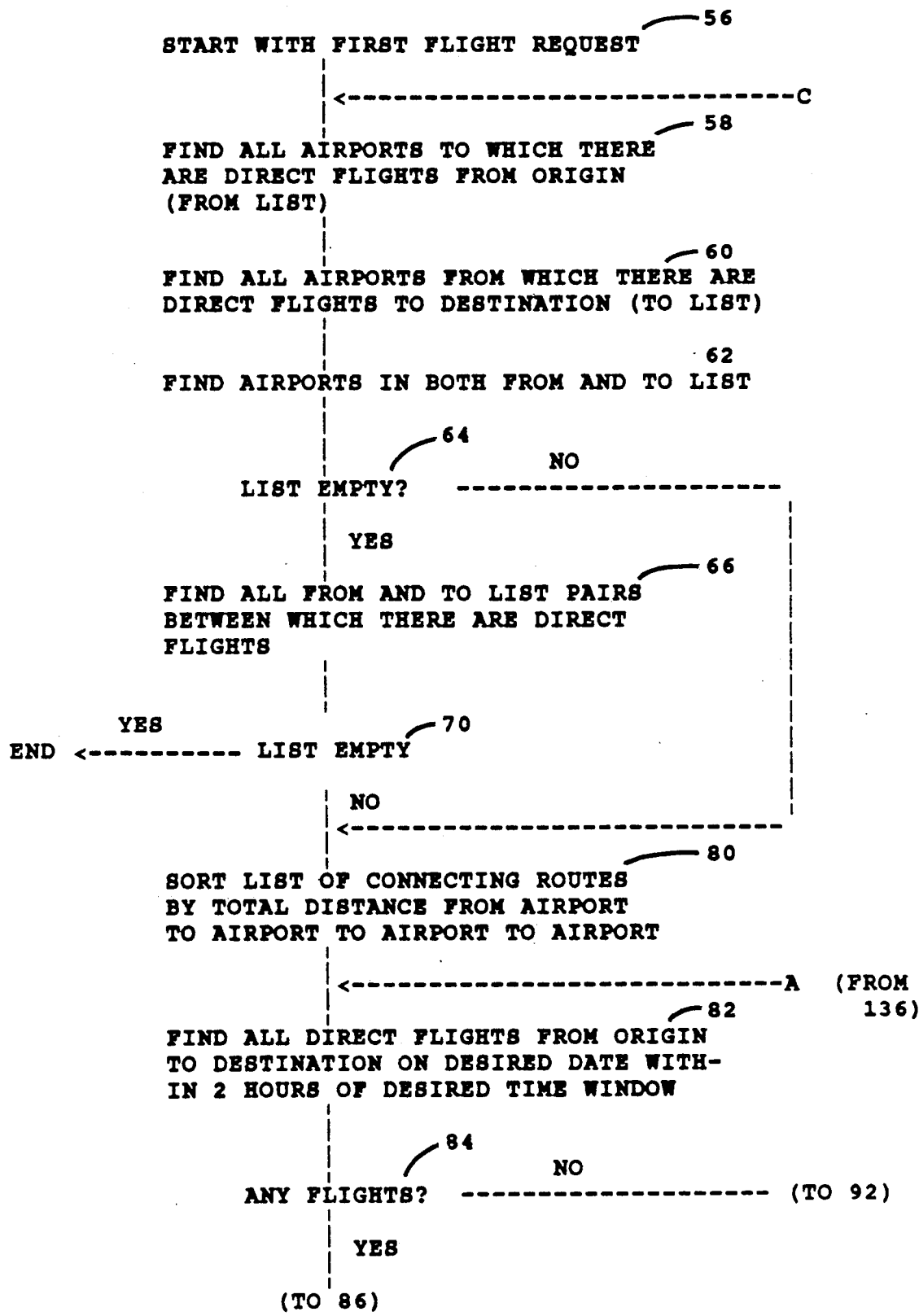
FIG. 4 which consists of FIGS. 4a through 4e, is a flow chart illustrating a flight search process which forms another part of an example of the invention.
Figure 4B:
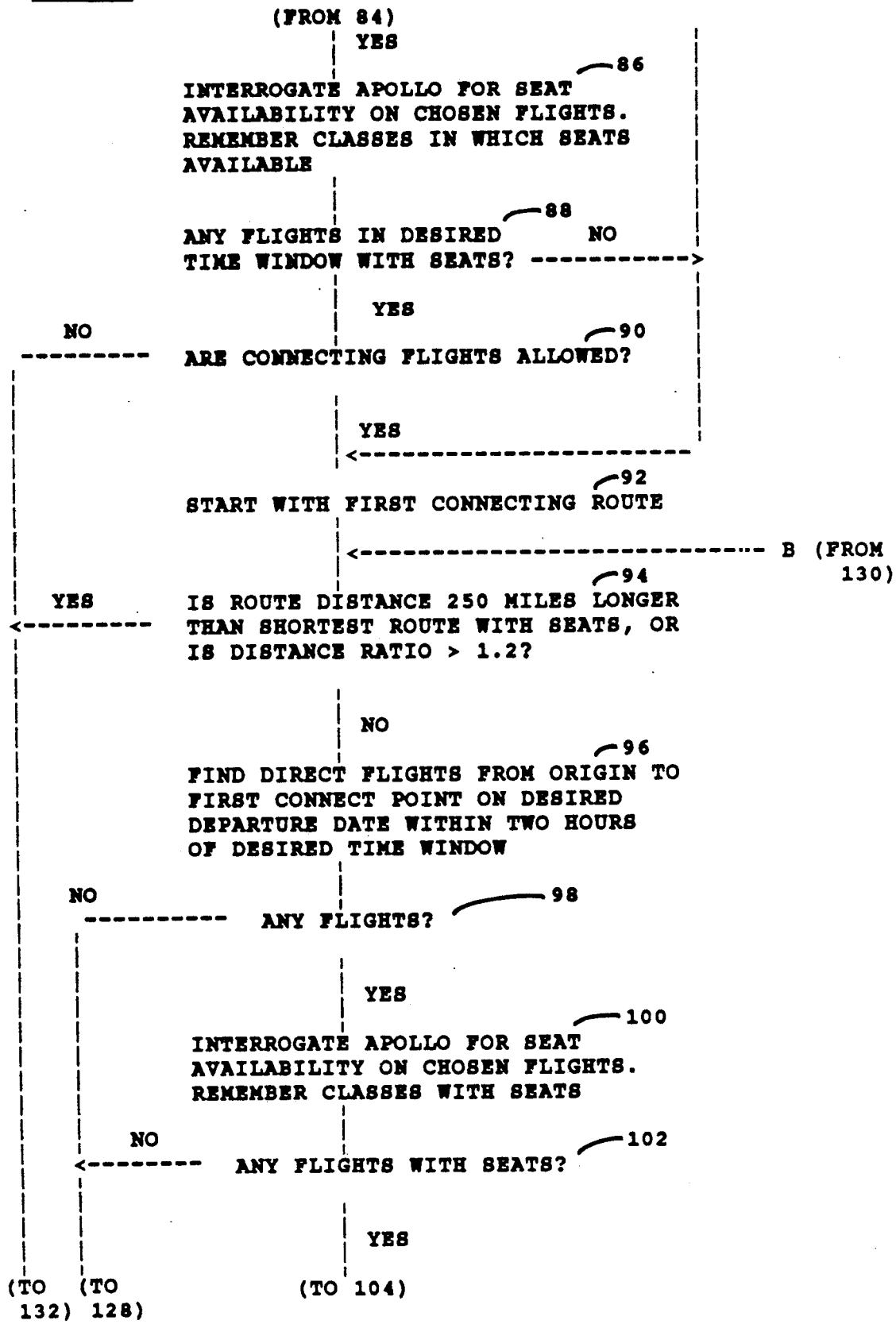
Figure 4D:
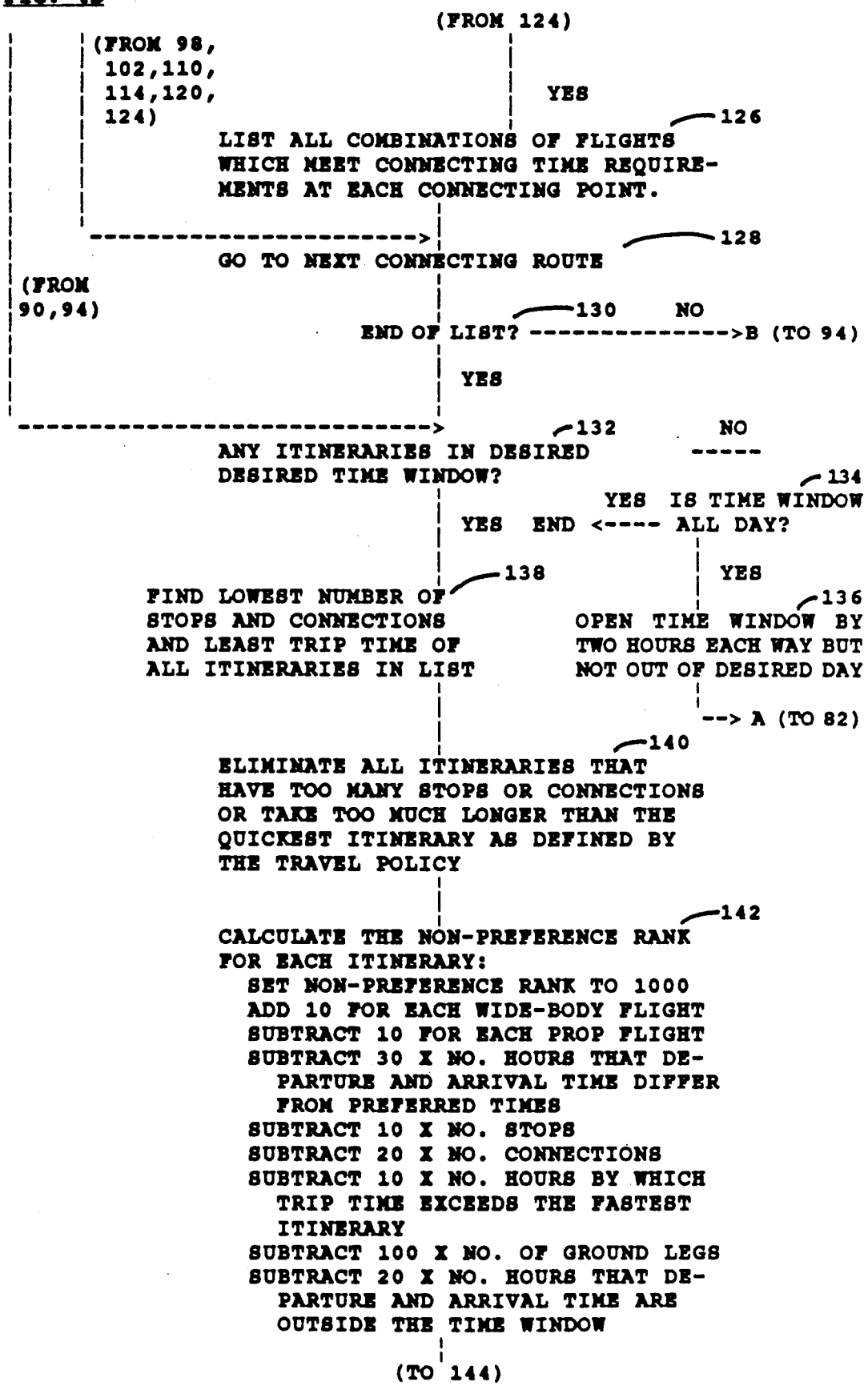

The purpose of the flight search procedure illustrated in FIG. 4 is to find all of the itineraries which could be used to satisfy the trip request being processed (e.g., for which flight and seats are available and which meet the constraints of the relevant policy file and traveller file and any other constraints that may have been keyed in FIG. 3) and to rank these candidate itineraries in terms of "non-preference" factors (e.g., wide body aircraft is better, stops are undesirable, etc.) and to rank them in terms of personal preference factors (e.g., this traveller prefers this particular airline and dislikes another airline, or wishes to avoid a particular airport, etc.). The output of this flight search procedure of FIG. 4 is a set of itineraries which have survived so far as candidates for this trip, ranked as stated, which can then be processed in accordance with the procedure of FIG. 5 to find the lowest fare candidate itineraries from which the travel arranger can select one for this trip request.

The flight search process starts at step 56 with the first flight (or trip) request which has been processed through the steps of FIG. 3, and at step 58 searches tariff file 20 to find all airports to which there are direct flights from the origin of the trip being planned. Any airport which is found in this search is added to a temporary list called a From List. At step 60 processor 18 again searches tariff file 20, but this time for all airports from which there are direct flights to the destination location of the trip being planned, and places all finds in another temporary list called a To List. For example, if the origin is JFK airport and the destination is Los Angeles International airport, the From List would contain cities (in the U.S.A. in this example) such as Kansas City, St. Louis and Chicago which have direct flights from JFK, and the To List would contain those cities (again in the U.S.A. in this example) from which there are direct flights to Los Angeles International. In this example each of these two lists would contain well over 50 cities. At step 62 processor 18 starts a sequence designed to find candidate itineraries each of which would consist of connecting rather than direct flights. To start this, at step 62 processor 18 looks for possible 2-leg routes from the origin to the destination of the trip request being processed, by searching the From List and the To List for any airports which are in both lists and to thereby create another temporary list, of airports which are common to the From and To lists. For an airport to qualify for this Common Airport List there must be a direct flight leg from the origin (JFK) to that airport (e.g., Atlanta) and there must be a direct flight from that airport (Atlanta) to the destination (O'Hare). If the test at step 64 determines that the Common Airport List is empty, i.e., there is no airport to which there is direct flight from the oriqin and from which there is a direct flight to the destination (i.e., that there are no candidate 2-leg itineraries), the process goes to step 66 to see if any 3-leg itineraries can become candidates; to this end step 66 is a search in the tariff file and the From and To lists for all direct flights from any airport in the From list to any airport in the To list, i.e., to find each pair of airports in which (1) one of the airports in a pair is in the From List and the other is in the To List and (2) there is a direct flight between the airports in the pair. Stated differently, step 66 finds the intermediate leg in each of the possible 3-leg trips between the origin and the destination of the trip request. If the test at step 70 shows that there are no such 3-leg trips, the process ends because the system has not been able to automatically create an acceptable itinerary. If the list tested at step 70 is not empty (i.e., there are possible 3-leg itineraries between the origin and destination of the trip request being processed), or if the test in step 64 shows that there are 2-leg itineraries which are candidates, processor 18 at step 80 sorts the list of possibly acceptable connecting routes (found in steps 62 and 66) by total distance, i.e., by the sum of the distances of the legs of each candidate multi-leg route. At this stage, processor 18 has created a list of all multi-leg routes which so far conform to the trip request constraints and therefore are candidate routes or itineraries. At the next step, 82, processor 18 looks for possible direct flights from the origin to the destination which would be candidate itineraries, by searching tariff file 20 to find all direct flights which are within a set time, e.g., two hours, of the desired time window. If the test at step 84 shows that there are such direct flights, the process enters a sequence to see if these flights have seats available and, to this end at step 86 it establishes a connection with an airline reservation system such as Apollo and interrogates it for seat availability on each of the flights found in step 82 (direct origin-to-destination fights), and temporarily stores the information from Apollo identifying what seats are available and in what class or classes. If the test at step 88 shows that there are flights (direct) with seats in the desired class and in the desired time window, processor 18 at step 90 checks if connecting flight routes are allowed for this trip request, as specified in the procedure of FIG. 3 or as specified by the applicable traveller and/or policy records in traveller file 22). If connecting flights are allowed, processor 18 goes to step 92 to start processing the multi-leg routes sorted in step 80. Note that step 92 can be reached directly from the test at step 84 if it shows that there are no direct flights from the origin to the destination of this trip request, and from step 88 if the test there shows that there are no direct flights with seats in the desired time window. In order to further process the connecting flight routes which are candidates at this stage, at step 92 processor 18 starts with the first connecting route in the list sorted at step 80, and at step 94 checks if the connecting route under consideration makes sense i.e., conforms to a pre-stored reasonableness standard if (1) the connecting route distance is greater by a preset distance, e.g., 250 miles, than the shortest possible route (the route from the origin to the destination found up until that point for which there are seats) and (2) the distance ratio (of the currently investigated connecting route and the same shortest possible route) is greater than a preset amount, e.g., 1.2. If the answer is negative to either inquiry, this means that the connecting route is still a candidate, and processor 18 goes to step 96 and interrogates tariff file 20 to find each direct flight which (1) is from the trip origin to the first connect point of the connecting route under consideration, (2) is on the desired departure date and (3) departs within two hours of the desired time window for this trip. If the test at step 98 shows that the search at step 96 was successful, i.e., there are direct flights meeting the constraints of step 96, processor 18 at step 100 interrogates the airline reservation system (e.g., Apollo) for seat availability (by class) on each of the flights found in step 96 and stores the seat availability information. If the test at step 102 shows that there are flights (found in step 96) with seats, processor 18 at step 104 stores the earliest arrival time of a flight with seats found at that stage, and at step 106 checks if the itinerary under consideration has two connecting points (i.e., if it is a 3-leg itinerary). If there are two connect points, at step 108 processor 18 interrogates tariff file 20 to find all connecting flights from connect point 1 (at the end of the first leg) to the next connect point which is on the desired departure date and is in the time span from the earliest arrival time stored at step 104 to, say, two hours after the time window desired for this trip (and set at step 46, FIG. 3). If any flights are found in the search at step 108, as determined in the test at step 110, processor 18 at step 112 interrogates the airline reservation system for seat availability, by class, on the flights found in step 108 and temporarily stores the seat availability information. If there are such flights with seats, as shown by the test at step 114, processor 18 at step 116 stores the earliest arrival time of such a flight with seats, and at step 118 interrogates tariff file 20 to find direct flights from the last-considered connect point to the destination of the trip which is on the desired departure date and is in the time span from the earliest arrival time stored at step 116 to, say, two hours from the desired time window for this trip. Note that step 118 can be reached directly from step 106 if the test there gives a negative answer, i.e., if that test shows that the itinerary under consideration has only 2 legs. If the test at step 120 shows that the search so far was successful in finding suitable flights for the second or third leg of the itinerary under consideration, at step 122 processor 18 interrogates the airline reservation system for seat availability on each of these flights and stores the seat availability information (by class). If the test at step 124 shows that there are such flights (found in step 118) with seats, at step 126 processor 18 lists all combinations of flights which meet the connecting time requirements discussed above at each connecting point of the route found through the last run through steps 92–124, and goes to step 128 to similarly process the next connecting route from the list sorted at step 80. Note that step 128 can be reached directly from any one of steps 98, 110, 114, 120 and 124 if the tests there give the indicated results leading directly to step 128 (i.e., if the consideration of one connecting route shows that it is not suitable, the process goes to step 128 to start checking another such route). If the test at step 130 shows that there are yet-to-be-processed connecting routes in the list sorted at step 80, processor 18 returns to step 94 to start similarly processing the next route from that list. If the test at step 130 shows that all of the multi-leg routes sorted at step 80 list have already been processed, processor 18 goes to step 132, which can also be reached directly from any one of the tests at steps 90 and 94 if the tests there lead directly to step 132 as indicated. If the test at step 132 shows that no itineraries were found in the desired time window for the trip request being processed, the test at step 134 checks if the time window is as wide as possible, e.g., if it is the entire desired day for the trip. If it is, the process ends because it was not possible to find a satisfactory itinerary given the constraints of the trip being processed (another trip request can be started as in FIG. 3, with different parameters). If step 134 shows that the time window for the trip is not all day, processor 18 widens it at step 136 by a set period, say, two hours, but not out of the desired day, and the process returns to step 82 to look for an itinerary conforming to the same trip request but with the widened time window. If the test at step 132 shows that there are itineraries which meet the desired trip parameters, at step 138 processor 18 interrogates these itineraries to find the one with the lowest number of stops and connections and the least trip time, and at step 140 checks the list of possible itineraries remaining after step 132 and the traveller file (the relevant policy record and traveller record for the trip being processed) and eliminates all itineraries which have more stops or connections than allowed by the particular policy and/or traveller record (or override entries at FIG. 3) or take more than a set amount of time longer than the quickest itinerary, again on the basis of the parameters set in the particular policy and/or traveller record and/or overrides. For each of the candidate itineraries which remains after step 140, the processor at step 142 calculates a "non-preference" rank and at step 144 calculates a "preference" rank, e.g., by using the calculations illustrated at steps 142 and 144, respectively, in the drawing. The non-preference ranking addresses generally desirable or undesirable aspects of travel while the preference ranking addresses the particular preferences of the traveller being serviced. For example, at step 140 an itinerary is ranked by adding to its initial rank of 1000 points (10 in this example) if only wide-body aircraft is used in it, subtracting 10 points for each stop in the itinerary, etc. At step 144, the rank starts with the rank resulting from step 142 and point are added or subtracted depending on the personal preferences of the particular traveller: e.g., add 100 points for each flight leg in the itinerary on an airline which this traveller prefers but subtract 100 points for each leg on an airline which this traveller dislikes, etc. These personal preferences can be entered in the FIG. 3 procedure, or they can be made a part of the traveller record or policy record for that traveller in traveller file 22 and extracted therefrom as needed by processor 18. If the test at step 146 shows that there are more flight requests entered through the procedure of FIG. 3 (e.g., an outbound trip can be one request and an inbound trip can be another request), processor 18 returns to step 58 to start similarly processing the next trip request entered in the FIG. 3 procedure; if there are no more flight (or trip) requests the process of searching for suitable itineraries ends and processor 18 goes to the fare search process illustrated in FIG. 5 to find the best fares for the candidate itineraries.

Figure 5B:
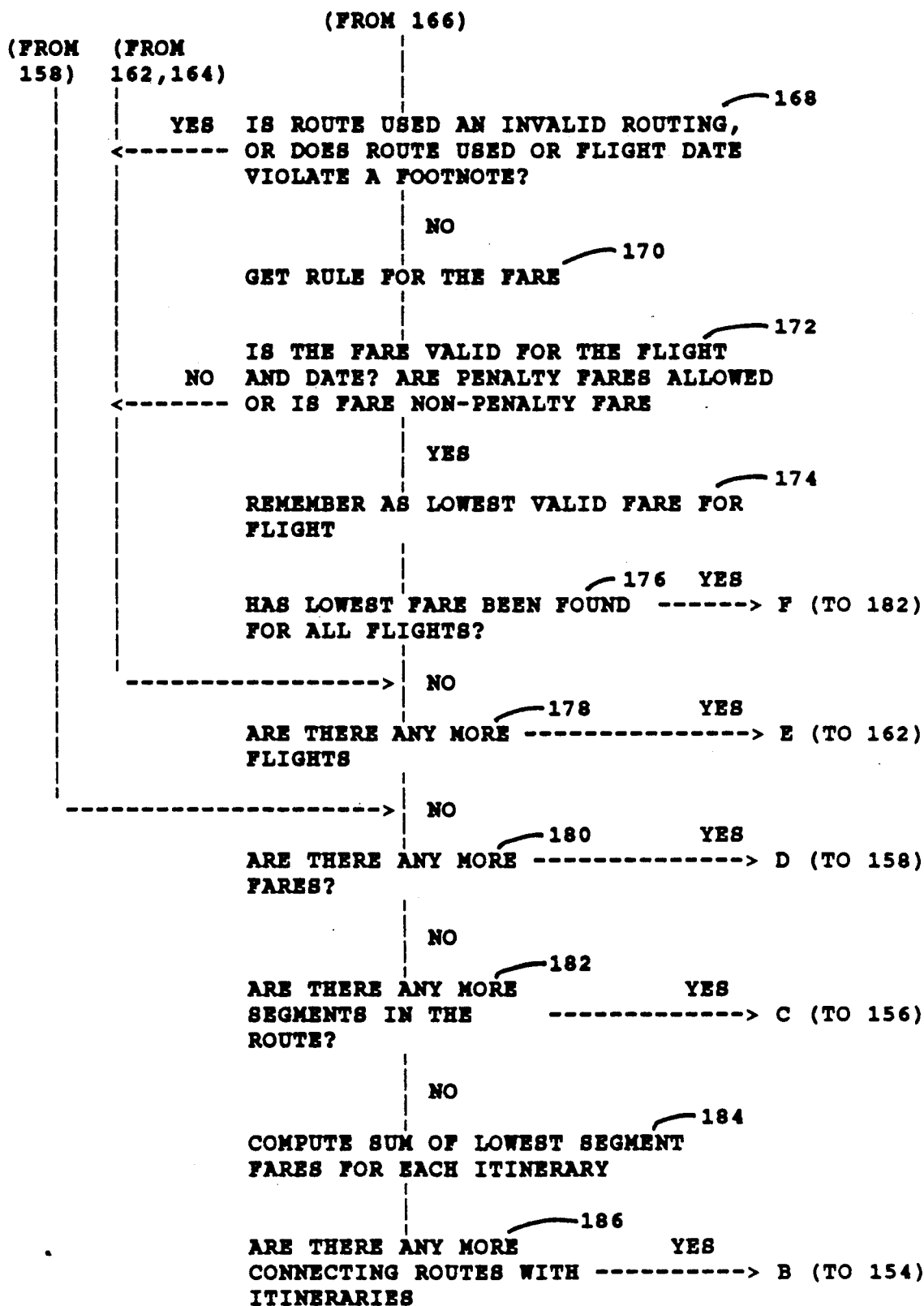
FIG. 5, which consists of FIGS. 5a through 5d, is a flow chart illustrating a fare search process which forms yet another part of an example of the invention.
Figure 5C:
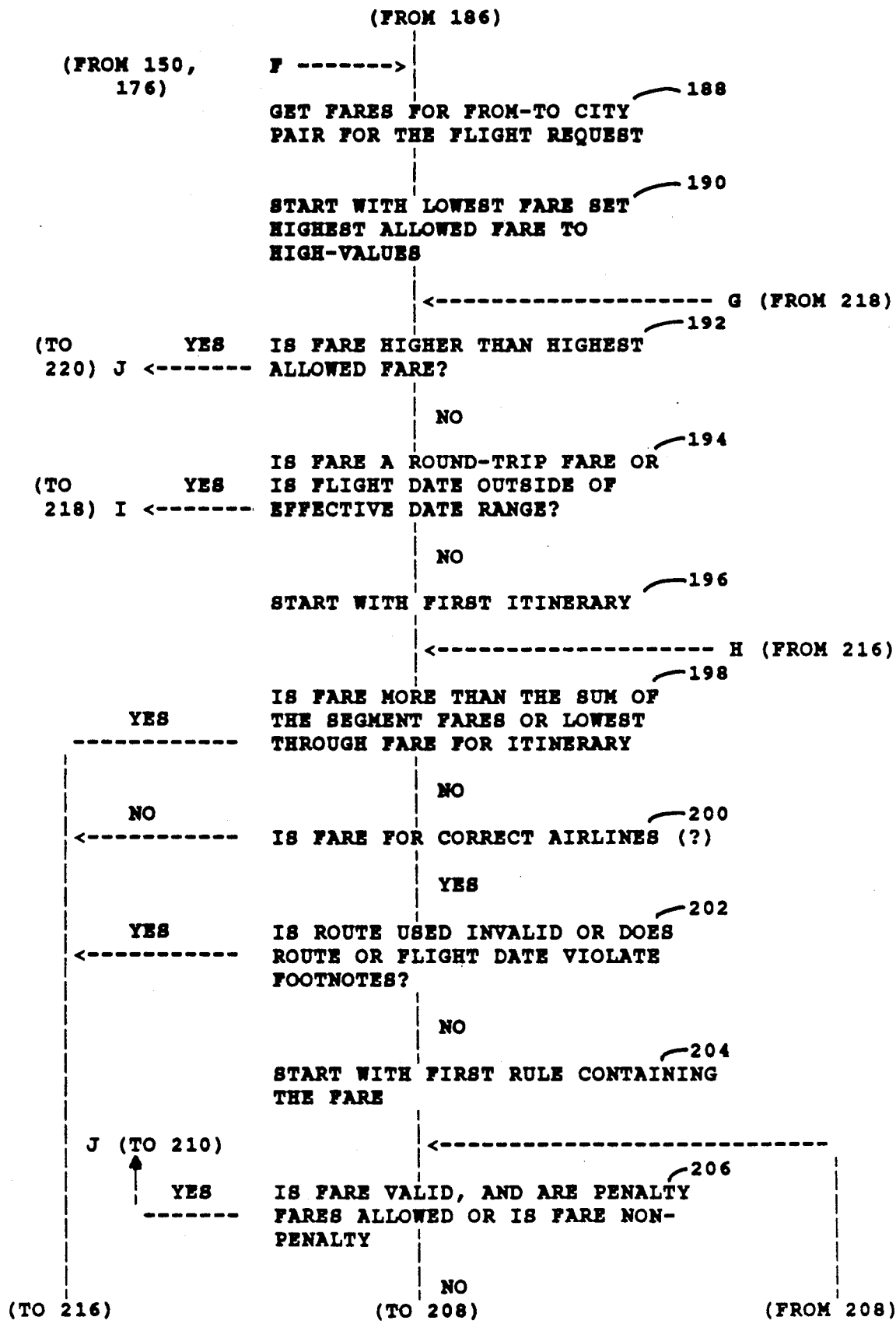
Figure 6A:
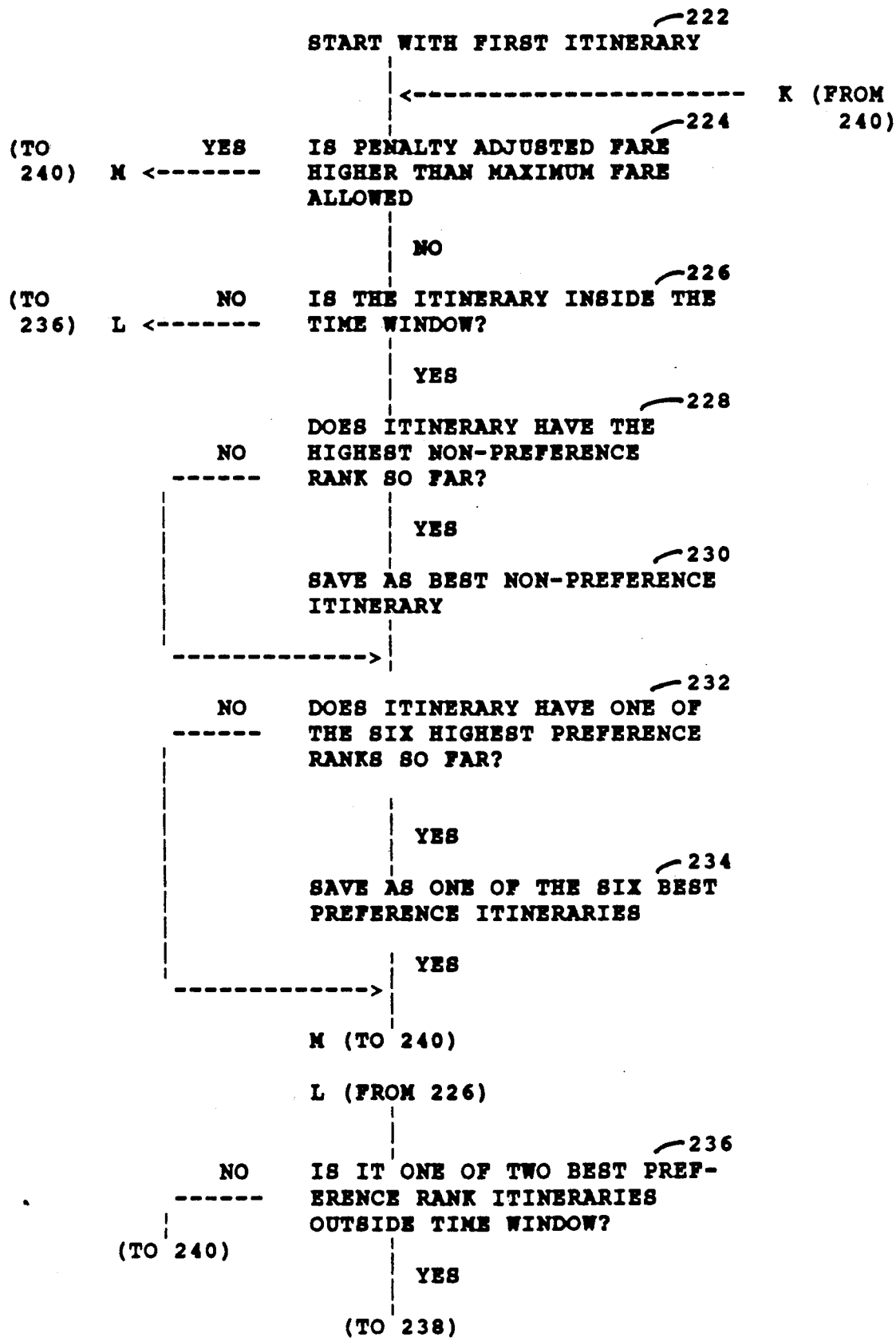
FIG. 6, which consists of FIGS. 6a and 6b, is a flow chart illustrating a best flight search process which forms still another part of an example of the invention.
Figure 6B:
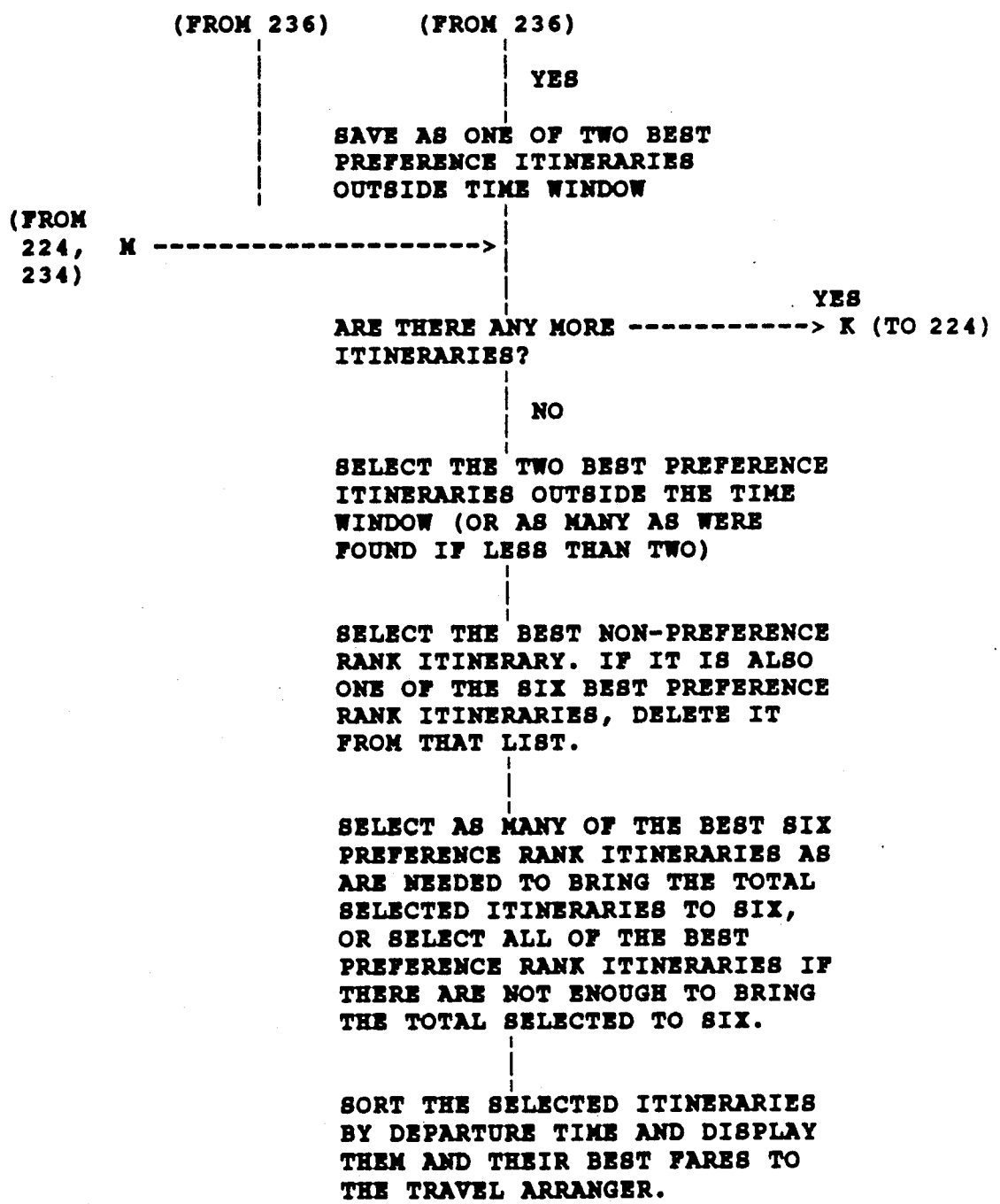

In FIG. 5 the purpose is to find the best (lowest) valid fare for each of the candidate itineraries (direct flight and multi-leg routes) remaining after the FIG. 4 procedure, so that this information can be used in the procedure in FIG. 6 to find the several best itineraries from which the travel arranger can select the one to be used for this trip. The procedure in FIG. 5 finds the least costly but still valid fare for each leg of each multi-leg route which is still a candidate, the least costly but still valid sums of segment fares for each such multi-leg route (and thus the cost of each candidate itinerary using connecting flights), and the least costly but still valid end-to-end (or through) fare for each itinerary (direct or connecting) which is still a candidate for the trip request being processed. The FIG. 5 process starts at step 148 with the first flight request which was entered in the process of FIG. 3 and processed through the steps of FIG. 4, and at step 150 checks if the process of FIG. 4 produced any connecting flight itineraries which are still candidates for this trip (as ranked at steps 142 and 144 there). If it did, processor 18 at step 152 starts with the first connecting route for which the process of FIG. 4 found a candidate itinerary, and at step 154 starts with the first segment of that route where a "segement" is a direct flight between two airports. An example is an itinerary consisting of a direct flight from Washington, D.C. (DCA) to Chicago (ORD), connecting within two hours from arrival at Chicago to a direct flight from ORD to San Francisco (SFO), with an overnight stay in San Francisco and a direct return flight from SFO to DCA. This is a round-trip itinerary which has two segments in the outbound part from DCA to SFO and one segment in the inbound part from SFO to DCA. In this example, the invented system checks if the "sum-of segments fare" resulting from adding the individual fare for the direct flight from DCA to ORD and the individual fare for a flight from ORD to SRO, would provide a greater benefit than, say, using a one-way fare from DCA to SFO or a round-trip from DCA to SFO and back to DCA. At step 156 processor 18 interrogates tariff file 20 to find the all fares for the city pair at the origin and destination of this route segment, starting with the lowest fare. At step 158 processor 18 checks tariff file 20 to see if the fare found in step 156 is a round-trip fare, or if the flight of interest at the time is outside of the effective dates for the fare. Because round trip fares are considered undesirable at this stage of the process, and because flights outside the effective date for the segment fare are not of interest at this time, if the answer at step 158 is yes this fare should not be kept as a candidate and processor 18 therefore jumps to step 180 to see if there are any more fares for this segment of this route. If the answer at step 158 is no (i.e., this fare is still a candidate), at step 160 processor 18 starts with the first flight with that fare which is used in at least one of the itineraries which are still candidates, and at step 162 checks if the lowest valid fare for that flight has been found yet (by interrogating tariff file 20). If the answer at step 162 is no (and the process is forced to answer no for the first pass through that step 162), at step 164 processor 18 checks if the fare is current for the airline in question and, if it is, gets the routing and footnotes for that fare form tariff file 20 at step 166 and then checks at step 168 if the route used is invalid and if the route used or the flight date violate a footnote, the check being against the routing and footnotes extracted at step 166. If the answer at step 168 is no (i.e., if the route is valid and no footnote is violated), at step 170 processor 18 gets from tariff file 29 the rule for that fare and at step 172 checks the fare to see if it is valid for the flight and date under consideration at that time, if any penalty fares are allowed (as determined by the trip request; a penalty in this context is, e.g., a trip cancellation penalty) and if the fare is a non-penalty fare. If the answer is yes (i.e., the fare is valid for this flight and date and either it is not a penalty fare or penalties are allowed for this trip), processor 18 stores this fare at step 174 for later use in the process, calling it at this time "the lowest valid fare" for the flight. At step 176 processor 18 checks if it has already found the lowest valid fare for all flights in the itinerary under consideration and, if the answer is no, checks at step 178 if there are more flights for this leg of the trip. If there are no more such flights step 180 checks if there are any more fares to be checked; if there are no more such fares, step 182 checks if there are any more segments in the itinerary under consideration and, if there are no more such segments, the process goes to step 184, where processor 18 uses information from step 174 to compute the sum of the lowest segment fares for each of the itineraries which are still candidates at this stage of the process. If the test at step 186 shows that there are no more connecting routes with candidate itineraries to be processed at that stage, at step 188 processor 18 gets from tariff file 20 all the fares which are through, or end-to-end, fares for routes from the origin to the destination of the flight request being processed (as distinguished from multi-leg routes assembled in accordance with the process described above), and at step 190 starts with the lowest of the through fare found at step 188 and sets a variable "highest allowed fare" to a high value unlikely to be exceeded by a real-life fare (e.g., to $10,000). At step 192 processor 18 checks if the current through fare under consideration is higher that the highest allowed fare and if so jumps to step 220 to find the best itineraries. if not, processor 18 checks at step 194 if same current through fare under consideration is a round-trip fare and if the flight date is outside the effective date range for that fare. If the answer to both questions is no, processor 18 starts at step 196 with the first itinerary which is still a candidate and at step 198 checks if the current through fare under consideration is more than the sum of the segment fares for the same itinerary or is more than the lowest through fare found up until that time for the same itinerary. If the answer is no to both questions, processor 18 at step 200 checks if the fare is for the correct airline and checks at step 202 if the route used is invalid and if the route or flight date violate the relevant footnotes in tariff file 20. If all answers at step 202 are negative (i.e., the fare is still a candidate), processor 18 starts at step 204 with the first rule containing this fare (in the tariff file) and at step 206 checks if the through fare under consideration is valid, and if penalty fares are allowed for this trip request or the fare is not a penalty fare. If the answer is no to any of these questions (i.e., the fare is not valid, or the fare is a penalty fare and penalty fares are not allowed for this trip request), the process loops through all the rules (from tariff file 20) which may apply, by going through step 208 and returning to step 206 from there, until the test at step 208 shows that there are no more rules containing the fare. When the answer at step 208 is no, this means that this fare cannot be used, and the process goes to step 216 to see if there are more itineraries to consider. If step 206 gives a yes answer, this means that this through fare is still a good candidate, and the process jumps to step 210 to save this fare as the lowest through fare for this itinerary. At step 212 processor 18 checks if this is the lowest penalty adjusted fare so far (using for this calculation the information on penalty adjustments contained in the policy record in traveller file 22) and adds the fare allowances specified in the policy record to find the new, updated "highest allowable fare." If the test at step 214 shows that the lowest fare has not been found for all of the itineraries which are still candidates for the trip request being processed, the process checks at step 216 if there are any more candidate itineraries and, if the answer is no, checks at step 218 if there are any more fares to be checked through a similar process. If the answer at step 218 is no, the process checks at step 218 if there are any more flight requests to process similarly and, if the answer is no, goes to step 220, which is an exit to the "best flight search" illustrated in FIG. 6. The best fare search process illustrated in FIG. 5 loops as needed depending on the answers at the test points, in the manner illustrated in the drawing, to ensure that the fares and itineraries remaining for use in the best flight search process are still candidates which conform to the constraints of the tariff file, the traveller record and the policy record for the trip being processed and, of course, the parameters of the trip entered during the process illustrated in FIG. 3. Thus, if the answer at step 150 is no, the process jumps to step 188 to start looking at through fares because step 150 has shown that there are no multi-leg itineraries found through the process of FIG. 4. If the answer at step 158 is yes (i.e., this fare is not suitable), the process jumps to step 180, to see if there are any more fares to consider. The process jumps to step 178 to see if there are any more flights to consider: if the answer at step 162 is yes (i.e., the lowest fare for this flight has already been found), or the answer is no at step 164 (i.e., this is not a current fare for this airline), or the answer is yes at step 168 (i.e., this route is not suitable or the flight date is not good), or the answer at step 172 is no (i.e., this fare is not valid for this flight and this date, or this is a penalty fare but penalty fares are not allowed for this trip). If the answer at step 176 is yes (i.e., the lowest fare has already been found for all flights in this segment of this route), the process jumps to step 182 to see if there are any more segments in this route so they can be similarly processed. If &:he answer at step 178 is yes (i.e., there are more flights for this segment or leg of this route), the process returns to step 162 to see if the lowest fare for the next candidate flight has been found yet. If the answer at step 180 is yes (i.e., there are more fares for this leg of this route), the process returns to step 150 to start checking the next fare for this leg of this route to see if it should remain a candidate fare. If the answer at step 182 is yes (i.e., there are more segments in this route), the process returns to step 156 to start processing the next candidate segment in this route. If the answer at step 186 is yes (i.e., there are more connecting routes with itineraries which are still candidates), the process returns to step 154 to start processing the next candidate route. If the answer at step 192 is yes (i.e., this through fare is higher than the highest allowed fare at that stage), the process jumps to step 220 because the through fare clearly could not be more desirable. If the answer at step 194 is yes (i.e., this through fare is a round trip fare or the flight is outside the effective date range for this trip request), the process jumps to step 218 to see if there are any more fares to process similarly.

FIG. 6 illustrates the process which searches for the best itineraries which have remained as candidates for this flight request after the process of FIG. 5. The product of this process is a selected small set of candidate itineraries (e.g., six) from which the travel arranger can select one to be actually ticketed. The process of FIG. 6 starts at step 222 with the first of the candidate itineraries remaining after the process of FIG. 4, and at step 224 checks if the penalty adjusted fare (found at step 210) for this itinerary is higher than the maximum fare allowed (found in step 212) for this flight request. If it is not (i.e., if the fare now being considered is still a good fare), step 226 checks if the itinerary is within the time window set for this trip and, if it is, step 228 checks if this itinerary has the highest non-preference rank so far (as computed at step 142). If it does, this itinerary is saved at step 230 as the "best non-preference" itinerary. At step 232 the process checks the same itinerary to see if it has one of the six best preference ranks found so far and, if its does, it is saved at step 234 as one of the six best "preference" itineraries, and the process goes to step 240, to check if there are any more candidate itineraries to be processed similarly. If there are, the process returns to step 224 and starts with the next candidate itinerary. If at step 226 the test shows that the itinerary being processed is not inside the desired time window for the trip, the process jumps to step 236, to check if this itinerary is one of the two best preference rank itineraries outside the desired time window for this trip and, if it is, it is stored as such at step 238. If the test at step 228 shows that the itinerary being tested does not have the highest preference rank so far, the process jumps to step 232 for the check if this itinerary has one of the six highest preference ranks so far, and if it does not, the process jumps to step 240 to see if there are more itineraries to be processed. Similarly, if the itinerary tested at step 236 is not one of the two best preference itineraries outside the desired time window for this trip, the process jumps to step 240 to see if there are more candidate itineraries to consider. Once the test at sep 240 shows that all candidate itineraries have been processed through this step of FIG. 6, the process at step 242 selects the two best preference itineraries outside the desired time window (as saved at step 238, or the single such itinerary if only one was found, or none if none was found) and at step 244 selects the best non-preference itinerary saved at step 230, but deletes it from the list of candidate itineraries if it is also one of the six best preference itineraries saved at step 234. At step 246 processor 18 selects as many of the best preference itineraries (from step 234) as are needed to bring the total selected itineraries (selected in steps 242, 244 and 246) to six, or selects all of the best preference itineraries if there are not enough other selections to bring the selections to a total of six, and at step 248 processor 18 sorts the selected itineraries by departure time and displays those itineraries, together with the best fares for them, on the screen of the travel arranger's equipment (where they can be printed out if desired). At this stage the processor has supplied to the travel arranger up to six candidate itineraries, of which (1) up to two are the best "preference" itineraries which are outside the time window for this trip request (i.e., the up to two least costly candidate itineraries given the various constraint discussed above, including the personal tastes of the traveller for factors such as choice of airlines and airports), (2) up to one "non-preference" itinerary (i.e., the least costly candidate itinerary given all the same constraints but not the personal tastes of the needed to bring the total number to six) of the best "preference" itineraries. The itineraries in category (1) are presented so that the travel arranger can decide if the cost is attractive enough to justify changing the trip request (e.g., if the original trip request said that there should be no departures earlier than 7 A.M. but the itinerary in category (1) starts with a 6:50 A.M. flight and is much cheaper than the others, the traveller may elect to take it).

Figure 7A:
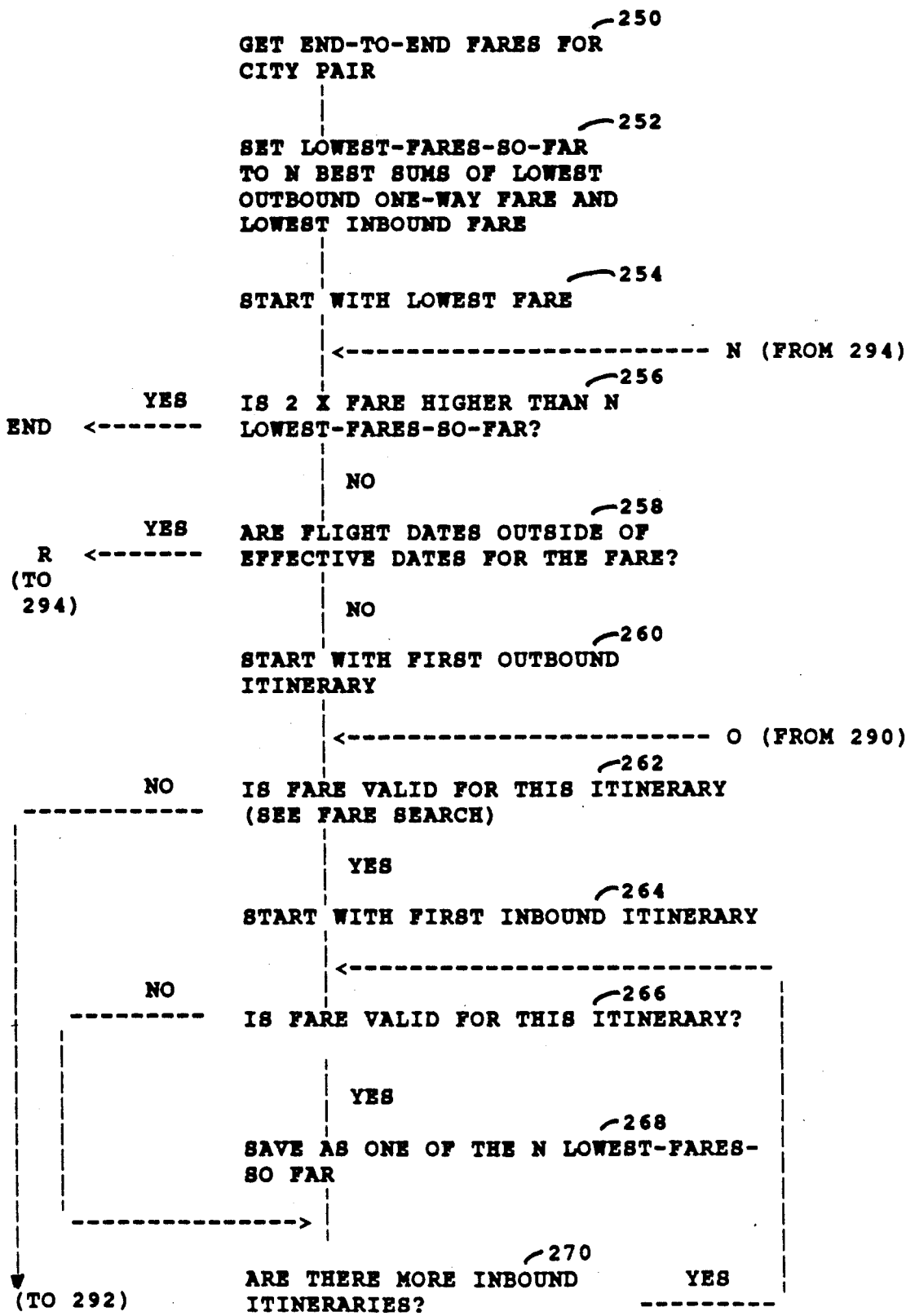
FIG. 7 which consists of FIGS. 7a through 7c, is a flow chart illustrating a round trip fare search to find the N least expensive itineraries, which can form a part of an example of the invention.
Figure 7B:
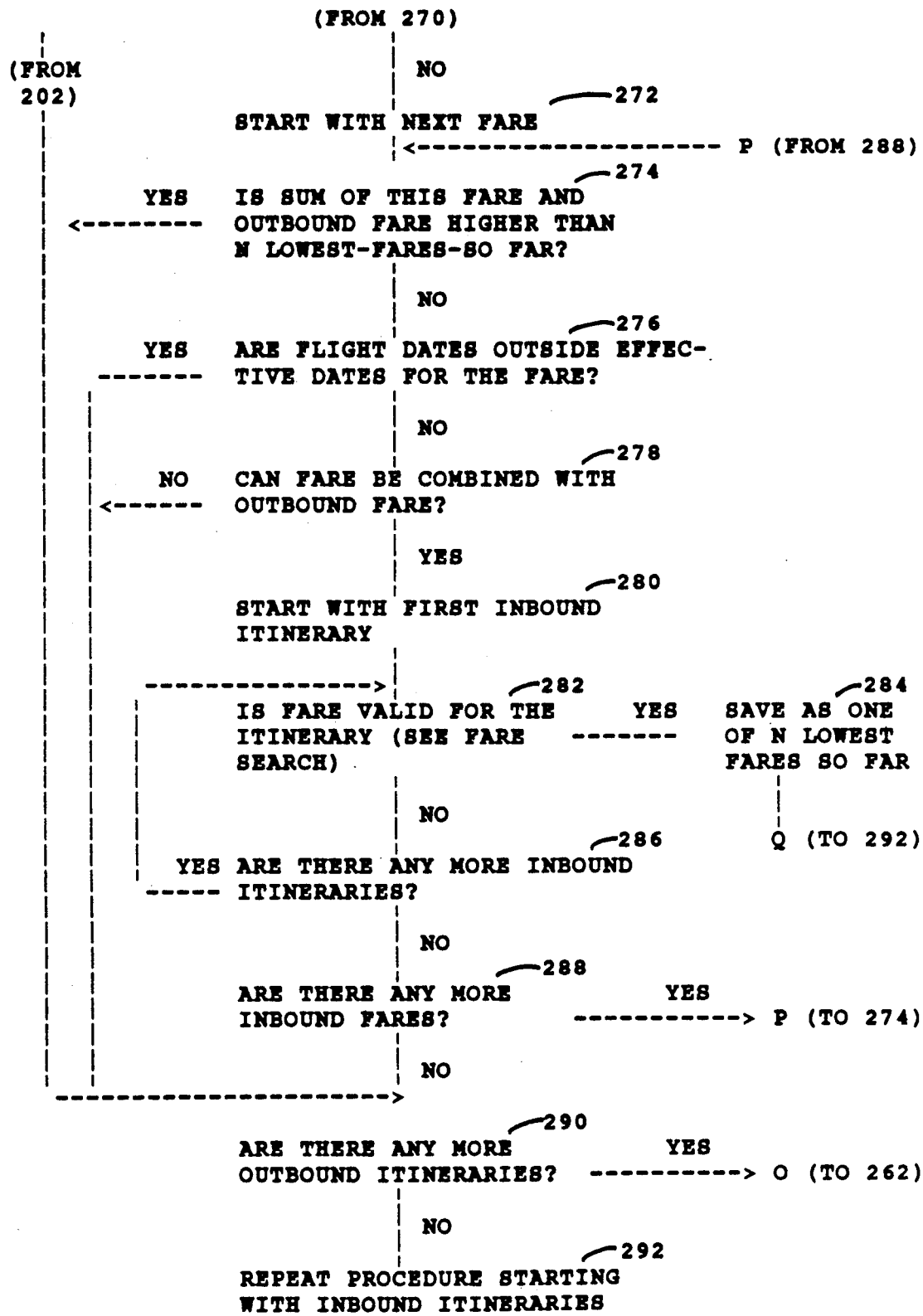

FIG. 7 illustrates an optional process for finding the least costly round-trip itinerary for a trip request, for example so that it could be compared with a trip using separate outbound and inbound fares or so that the round trip fare could be used in case the traveller would accept the restrictions that may be attached to such a fare. In the process of FIG. 7, at step 250 processor 18 searches tariff file 20 to find the candidate end-to-end fares for the city or airport pair specified in the trip request (e.g., JFK-O'Hare) in the trip initialization process of FIG. 3. At step 252 the process searches tariff file 20 to get the N (where N is a selected positive integer, e.g., six) sums each resulting from adding the lowest outbound one-way fare to the lowest inbound one-way fare for the trip request (e.g. JFK to O'Hare and O'Hare to JFK), and sets N respective variables called "lowest-fares-so-far" equal to these sums. At step 254 the process starts with the lowest candidate round trip (end-to-end) fare found in step 250 and compares it to the lowest-fares-so-far, and tests at step 256 which is higher. If the candidate round trip fare is higher, the process ends, because there is no price advantage to possibly offset the restrictions and inconvenience of a round trip fare. If the candidate round trip fare turns out to be less costly in the test at step 256, the process checks at step 258 if there are any flight dates in the trip being processed which are outside of the effective dates for the round trip fare being considered. If there are trip dates outside the effective dates for the candidate round trip fare, this round trip fare is not suitable, and the process jumps to step 294, to see if there are other round trip fares to be considered and, if there are, another round trip fare starts being processed back at step 256. If the test at step 258 shows that there are no flight dates outside the effective dates for the currently evaluated round trip fare, i.e., that this round trip fare is still a candidate, the process starts at step 260 with the first outbound itinerary for the trip being processed, and at step 262 checks if this round trip fare is valid for this itinerary, using the checking process discussed in connection with the fare search operations illustrated in FIG. 5. If the test at step 262 shows that this round trip fare is not valid for this first outbound itinerary the process jumps to step 290 to check if there are any more outbound itineraries. If the round trip fare is valid for the outbound itinerary the process in steps 260 through 270 checks whether the round trip fare is also valid for any inbound itinerary. If so it is saved at step 268 as one of the N "lowest-fares-so-far" and the process checks at step 270 if there are any more candidate inbound itineraries. If the answer is no, the process starts with the next round trip fare and checks at step 274 if the sum of this fare and this outbound fare is higher that the N lowest-fares-so-far. If the answer is no, the process checks at step 275 if the flight dates are outside the effective dates for this fare and, if the answer is no, checks if this inbound fare can be combined with this outbound fare. If the answer is yes, the process starts with the first inbound itinerary at step 280 and at step 282 checks if the fare is valid for this itinerary, using the fare search process discussed in connection with FIG. 5. If this test shows that this fare is valid, it is saved as one of the N lowest-fares-so-far at step 284. If it is not, the process checks at step 286 if there are any more inbound itineraries; if the answer is no, it checks at step 290 if there are any more outbound itineraries to be considered and, if the answer is no again, repeats the same procedure but this time starting with the inbound itineraries. After exiting from step 292, the process checks at step 294 if there are any more fares to consider and, if the answer is no, displays at step 296 the N itineraries with fares at the screen of the travel arranger's equipment.

Figure 8A:
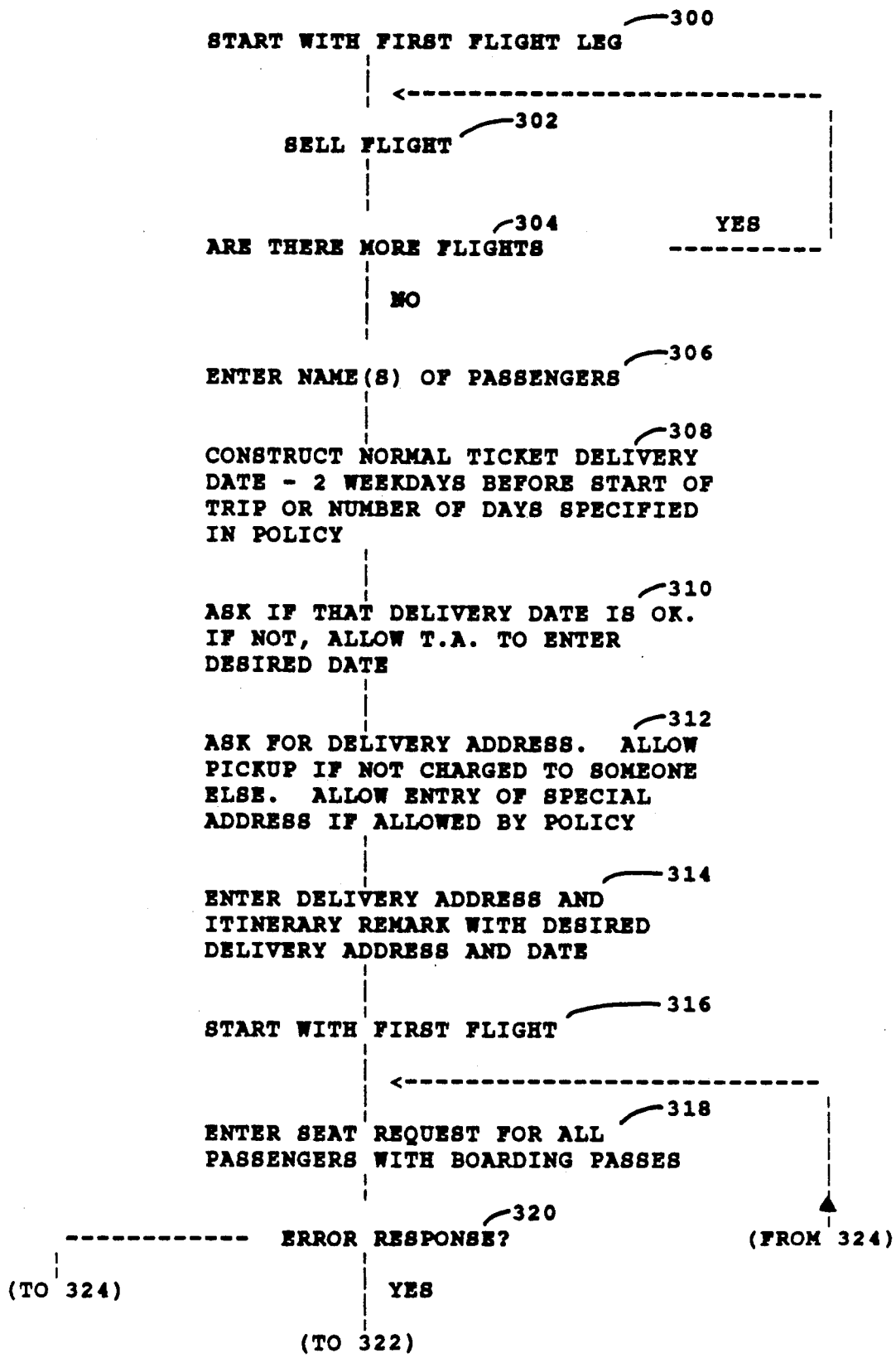
FIG. 8, which consists of FIGS. 8a and 8a is a flow chart illustrating a process for creating a passenger name record, which can form a final part of an example of the invention.
Figure 8B:
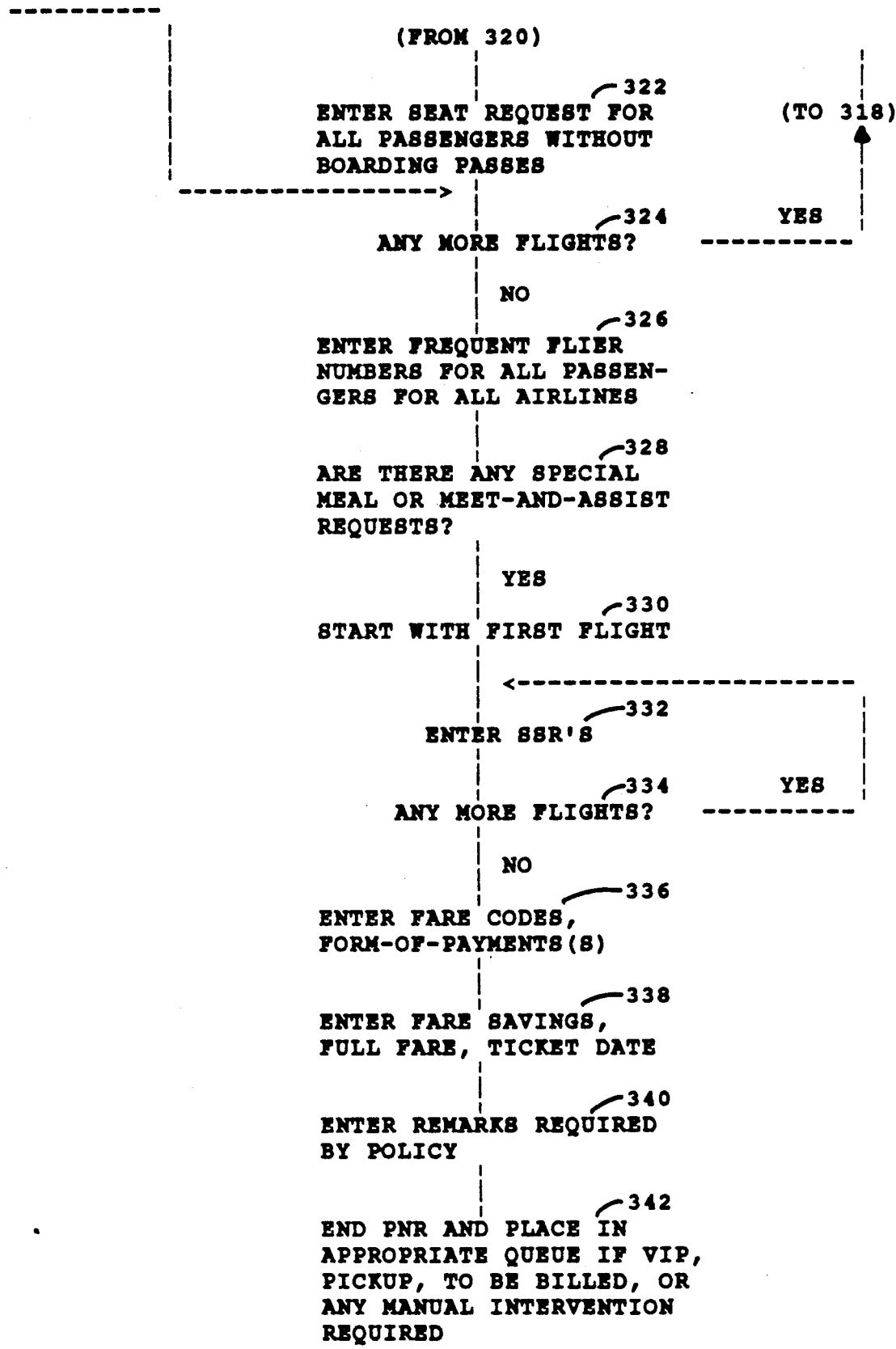

FIG. 8 illustrates the final stage in the processing of a trip request, the building up of what the industry calls a passenger name record or PNR. This stage is entered after the best itinerary has been selected automatically in accordance with this example of the invention and the travel arranger has been presented with the several best choices and has selected one of them for this trip. The process of FIG. 8 starts with the first flight leg of the selected itinerary at step 300 and at step 302 carries out the protocol for selling this flight leg using the appropriate airline reservation system format (e.g., the Apollo format). At step 304 processor 18 checks if there are any more legs (flights) in this itinerary, and loops through steps 302 and 304 until all flight legs have been sold in the same manner. At step 306 processor 18 supplies the name of the passenger (from the trip request entered in the procedure of FIG. 3), and in step 308 constructs a normal ticket delivery date, for example two weekdays before the trip or the number of days specified in the policy record which applies to this trip. Processor 18 then displays at step 310 the delivery date on the screen of the travel arranger's equipment, and asks the travel arranger to key in any change that may be desirable. At step 312 the processor asks the travel arranger for a delivery address such as the traveller's business or home address, or a special address (if such an address is allowed by the policy), or allows the travel arranger to specify that the ticket will be picked up at the airport from which the traveller will be leaving (as long as the traveller is not charging the trip to someone else). At step 314 processor 18 uses the information from the current traveller record and/or policy file to enter the indicated information in the transaction record. starting with the first sold flight at step 316, enters at step 318 a seat and boarding pass request for each passenger into the airline reservation system (e.g., Apollo). If at step 320 the Apollo system responds with an error message (because boarding passes are not allowed for this flight at this time), the process at step 322 enters into Apollo the seat request for all passengers without boarding passes, and checks at step 324 if there are any more flights in this itinerary. If there are no more such flights, at step 326 processor 18 enters into the Apollo system the frequent flier numbers of all passengers for all airlines, and at step 328 checks the trip request (and, if desired, the traveller and policy records) any special requests, such as special meals or meet-and-assist requests. If there are such requests, the process starts at step 330 with the first flight in this itinerary and at step 332 enters into Apollo the relevant special requests and loops through all flights in the itinerary until it exits through the negative answer at step 336. At step 338 processor 18 enters into the record for this itinerary the full price for a regular ticket for this trip, the savings because of the actual price for the itinerary selected through the invented process and the date of the trip, and also enters any remarks that may be required to be entered into this trip record by the pertinent policy record. At step 342 the PNR process is ended, the itinerary normally provided by the reservation system is printed (and, if desired and allowed at that location, the ticket is printed as well) and the printed material is placed in an appropriate queue for any further manual processing that may be appropriate.

As a simplified example of processing a particular trip request in accordance with the invention, consider a form used to make a flight request:

| From: NYC-NEW YORK CITY | To: LAX-LOS ANGELES INTL. |
|---|---|
| Date: 2/3/88 | |
| Departure time | Arrival time |
| Earliest: 8:00 A.M. | Earliest: |
| Latest: 10:00 A.M. | Latest: 3:00 P.M. |
| Preferred: 9:00 A.M. | Preferred: |
| Allow penalty fares: N | |

The above flight request is from any New York City airport (NYC is the code used by the airline industry for New York City) to Los Angeles International Airport (LAX is the code used by the airline industry for that airport) on February 3rd, 1988. The traveller wishes to depart no earlier than 8 a.m. and no later than 10 a.m., and would prefer to leave as close to 9 a.m. as possible. The traveller further wishes to arrive at LAX no later than 3 p.m. The use of penalty fares (i.e. fares with a penalty for changing or cancelling flights) are not allowed for this trip. To provide a simple example of how the exemplary system finds the appropriate itineraries, assume further that the travel policy being used allows the traveller to travel first class and does not allow the use of connecting flights if direct flights are available. The process would be as follows:

1. Find all cities to which there are direct flights from any New York City airport assume that there are 120 such cities.
2. Find all cities from which there are direct flights to Los Angeles International airport—assume there are 105 such cities.
3. Find all cities that are in both lists found in steps 1. and 2. assume that there are 40 such cities.
4. Sort the possible routes (including flying direct) by mileage.
5. From the tariff file find all direct flights from any New York Airport to Los Angeles International on Feb. 3rd, 1988, departing between 6 a.m. and noon and arriving no later than 5 p.m. (the time window by two hours in each direction). Suppose that there are 15 such flights.
6. Send a seat availability request to Apollo for flights from NYC to LAX on February 3rd, 1988 departing from 6 a.m. on. This returns seat availability for up to eight flights. Ask for seat availability for eight more flights, and continue to do so until seat availability for all 15 flights has been found or there are no more flights for February 3rd.
7. Eliminate any of the 15 flights for which there are no first class seats available. Suppose that 2 such flights are eliminated, leaving 13 possible flights.
8. Suppose that 8 of the 13 flights are non-stop, that the fastest one takes 5 hours 30 minutes, and that the travel policy allows no extra stops, and a maximum time of 2 hours more than the fastest flight. This eliminates any flight that has a stop and any flight that takes more than 7 hours 30 minutes, leaving say 8 flights.
9. Compute the preference and non-preference ranks for each flight. In the non-preference ranking widebody jet flights leaving close to 9 a.m. will have the highest rankings. Suppose that the traveller likes United Airlines, and would rather not leave from Newark Airport. Then in the preference ranking the flights on United Airlines would have 100 additional points. The highest ranked flights would be United Airlines flights leaving from JFK airport close to 9 a.m. Note that the highest non-preference rank might be a Continental Airlines flight leaving Newark at 9 a.m. precisely, but that the highest preference rank might be a United Airlines flight leaving JFK at 9:30 a.m.
10. From the tariff file get all the possible fares from NYC to LAX. Suppose that there are 2,000 such fares. Start at the lowest such fare—say $180.
11. Check if the valid dates for the fare include Feb. 3rd, 1988, and that the fare is not a round trip fare. If so, for each itinerary check if the fare is for the right airline, and is valid according to the footnote, routing and rules for the flight. In this case, since the request is for a non-stop first class flight the fare might be rejected because it is not a first class fare or because it requires a connection or both.
12. Continue looking through the list of fares until a valid fare is found for an itinerary most fares will be rejected because they are not first class, eventually there might be a fare that is a first class fare but which requires that the flight be a 'night flight' by the airlines definition. If one of the 8 flights left is a ,night flight, perhaps departing at 6 a.m. the fare will be valid for that flight, but not for other flights for the same airline leaving later in the day. Another first class fare might be valid only for flights between the Continental U.S. and Hawaii, and will be rejected for that reason.

13. Eventually a valid fare will be found for a flight within the time window—say for $600. Suppose that the travel policy allows the Trip Planner to use a fare that, after applying any penalties, is no more than $100 above the lowest penalty adjusted fare (in this case $600) found. The search for the lowest valid fare on each itinerary (in this case flight) will continue until such a fare is found for each itinerary, or until the next fare in the list is more than $700. Suppose that when that happens fares have been found for 7 of the 8 flights.

14. Among the flights left, find the two best flights outside the 8 a.m. to 10 a.m. departure window or outside the up to 3 p.m. arrival window that have the best preference ranks. This might be a 7:30 a.m. United flight from JFK and an 11 a.m. United flight from JFK. Also find, among the flights that are inside the departure and arrival window, the one with the best non-preference rank—perhaps a 9 a.m. Continental flight from Newark. Since 3 flights have been selected so far now choose from among those flights inside the departure and arrival windows the 3 flights (other than the flight chosen as having the best non-preference rank) with the best preference ranks. These might be a United 9:30 a.m. flight from JFK, an American 8 a.m. flight from JFK and a United 9:15 a.m. flight from Newark.

15. Sort the 6 chosen flights by departure time and display them to the travel arranger as shown below:

| Airline | Flight | From | Time | To | Time | Fare |
| --- | --- | --- | --- | --- | --- | --- |
| UA-UNITED | 101 | JFK | 7:30 A.M. | LAX | 10:30 A.M. | $550 |
| AA-AMERICAN | 212 | JFK | 8:00 A.M. | LAX | 11:00 A.M. | $700 |
| CO-CONTINENTAL | 057 | EWR | 9:00 A.M. | LAX | 12:00 NOON | $625 |
| UA-UNITED | 156 | EWR | 9:15 A.M. | LAX | 12:15 P.M. | $650 |
| UA-UNITED | 105 | JFK | 9:30 A.M. | LAX | 12:30 P.M. | $650 |
| UA-UNITED | 110 | JFK | 11:00 A.M. | LAX | 2:00 P.M. | $650 |

UA, AA and CO are the codes used by the airline industry for United Airlines, American Airlines and Continental Airlines respectively.

The travel arranger can then choose one of the flights shown—probably United flight 105, but possibly United flight 101, since it is $100 cheaper and leaves only 30 minutes outside the departure window.

As further background information, attached are:

Appendix A, which illustrates definitions for translating (formatting) the rules supplied from a commercial service auch as ATPCO into the novel form which makes these rules useful in practicing the invention;

Appendix B, which is an example of definitions of rule parameters;

Appendix C, which is an example of footnotes as supplied by a commercial supplier such as ATPCO;

Appendix D, which is an example of routings as supplied by a commercial supplier such as ATPCO; and Appendix E, which is a listing of an example of programs in FORTRAN which, when used in conjunction with a suitable mainframe computer, such as the equipment available from IBM under the designation 4341 (VM-CMS operating system), can carry out an example of the invented process described above.

We claim:

1. A travel planner system for automatically constructing itineraries with available seats for a traveler's trip request which conform to pre-stored reasonableness standards which include a satisfactory check on whether a connecting flight distance exceeds that of a possible direct flight by a preset distance or ratio, finding the fares, including constructing sum-of-segments fares, for each such itinerary which are valid under all the applicable airline tariffs and rules, finding itinerary-with-fare combinations acceptable in terms of cost and convenience to the traveler in accordance with an individualized travel policy of the traveller, and displaying at least some of the itineraries by departure or arrival time, said system comprising:

A. means for storing in machine-readable form:
  1. a tariff file means containing for a selected territory:
     a. the applicable individual direct flight schedules;
     b. the applicable airport minimum connecting times;
     c. the fares for the respective booking classes;
     d. the routings specifying if a particular fare can be used for a particular itinerary; and
     e. footnotes specifying when a particular fare is in effect;
  2. a traveler file means comprising:
     a. a travel policy records each specifying:
        (1) a set of reasonableness standards, including travel constraints pertaining to itineraries which are to be considered unreasonable regardless of cost;
        (2) a set of trip parameter trade-offs between cost and convenience; and
        (3) a set of parameters pertaining to elimination of itinerary-with-fare combinations which are more expensive and/or less convenient by a specified factor compared with the itinerary that provides an optimized combination of low cost and of convenience; and
     b. traveler records each identifying:
        (1) a respective traveler; and
        (2) a policy record applicable to said traveler; and
  3. a rules file means for storing all limitations and combinations of limitations in published airline rules relevant to the traveler, in machine-readable form, applicable to the fares to ensure that a particular fare is valid for a particular itinerary;
B. an entry device for entering travel parameters identifying a trip request, and a display device for displaying itinerary-with-fare combinations;

C. a communication device for connection to an airline booking system providing information on seat availability on specified flights per booking class;

D. a processor coupled to said entry and communication devices and comprising means responsive to said trip request to interrogate said tariff file and said rules file and said traveler file and to automatically communicate as needed with the airline booking system through said communication device, said processor further comprising means for:

1. using the tariff file to find candidate flights and construct direct and connecting itineraries for said trip which conform to said reasonableness standards;
2. using the communications device to find seat availability on said candidate flights and eliminating those candidate flights which have no available seats and any connecting itineraries using those flights;
3. using the tariff file and the rules file to find fares, including constructing sum-of-segments fares, for each remaining itinerary which are both valid and conform to the trip request;
4. using the traveler file for said traveler to find the itinerary-with-fare combination which gives an optimized combination of low fare and of convenience;
5. using the traveler file to eliminate itinerary-with-fare combinations which do not comply with the traveler record and the applicable policy record for reasons of cost and/or convenience relative to said optimized itinerary-with-fare combination, to thereby leave one or more itinerary-with-fare combinations which are valid and conform to said traveler file; and
6. displaying at least some of the remaining itinerary-with-fare combinations arranged by departure or arrival.

2. A travel planar system as in claim 1 in which said processor further includes means responsive to the selection of a displayed itinerary to use the communication device in a process comprising building a passenger name record (PNR) in the airline booking system booking the selected itinerary to ticket issuance.

* * * * *